United States Patent
Nagata et al.

(10) Patent No.: US 7,626,924 B2
(45) Date of Patent: Dec. 1, 2009

(54) TRANSMISSION DEVICE AND LABEL ALLOCATION METHOD

(75) Inventors: Akira Nagata, Kawasaki (JP); Shinya Kanoh, Kawasaki (JP); Keiji Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 550 days.

(21) Appl. No.: 11/243,871

(22) Filed: Oct. 5, 2005

(65) Prior Publication Data

US 2006/0221816 A1    Oct. 5, 2006

(30) Foreign Application Priority Data

Mar. 31, 2005    (JP)    ............................... 2005-102092

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)
*H04L 12/56* (2006.01)

(52) U.S. Cl. ..................... 370/221; 370/242; 370/389
(58) Field of Classification Search .................. 370/389

See application file for complete search history.

(56) References Cited

U.S. PATENT DOCUMENTS

| | | | | |
|---|---|---|---|---|
| 7,315,510 B1* | 1/2008 | Owens et al. | ............... | 370/218 |
| 2002/0172149 A1* | 11/2002 | Kinoshita et al. | ........... | 370/216 |
| 2002/0172150 A1* | 11/2002 | Kano | ......................... | 370/216 |
| 2003/0152024 A1* | 8/2003 | Yang et al. | ................. | 370/216 |
| 2006/0018252 A1* | 1/2006 | Sridhar et al. | ............... | 370/216 |

OTHER PUBLICATIONS

D. Awduche, et al. RSVP-TE: Extensions to RSVP For LSP Tunnels. http://www.ietf.org/rfc/rfc3209.txt Dec. 2001.
Louis Berger et al. GMPLS Based Segment Recovery. http://www.ietf.org/internet-drafts/draft-ietf-ccamp-gmpls-segment-recovery-01.tct Oct. 2004.

* cited by examiner

*Primary Examiner*—William Trost, IV
*Assistant Examiner*—Andrew Chriss
(74) *Attorney, Agent, or Firm*—Katten Muchin Rosenman LLP

(57) ABSTRACT

In a network having a main route and a protection route, a branch node reflects label limit information for the main route into the label limit information for the protection route, and allocates to the main route, a label related to the label for the protection route. On the other hand, a merge node reflects label limit information for the protection route into the label limit information for the main route, and allocates to the protection route, a label related to the label for the main route. Thus, labels having a relation can be allocated to the main route and the protection route.

20 Claims, 39 Drawing Sheets

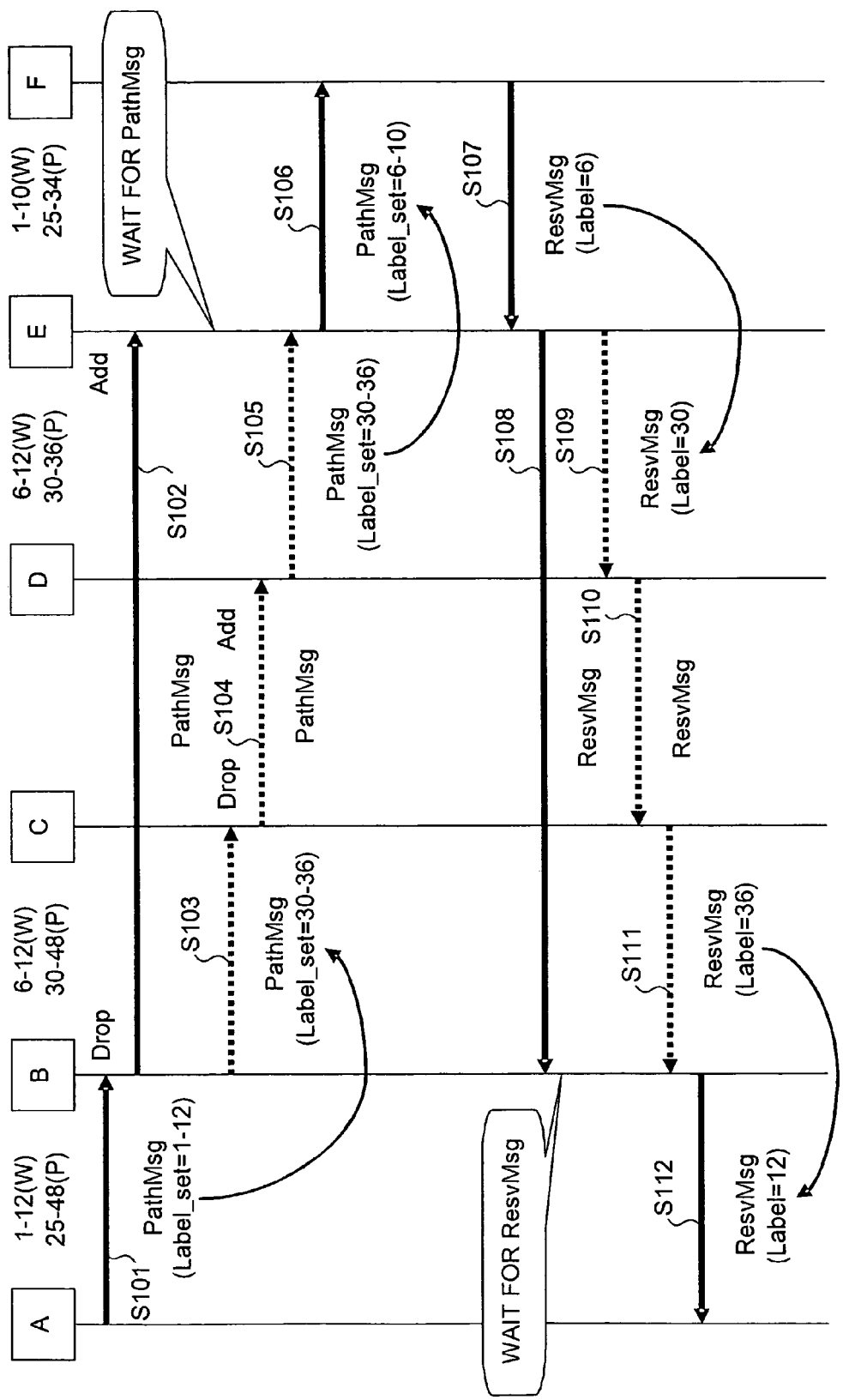

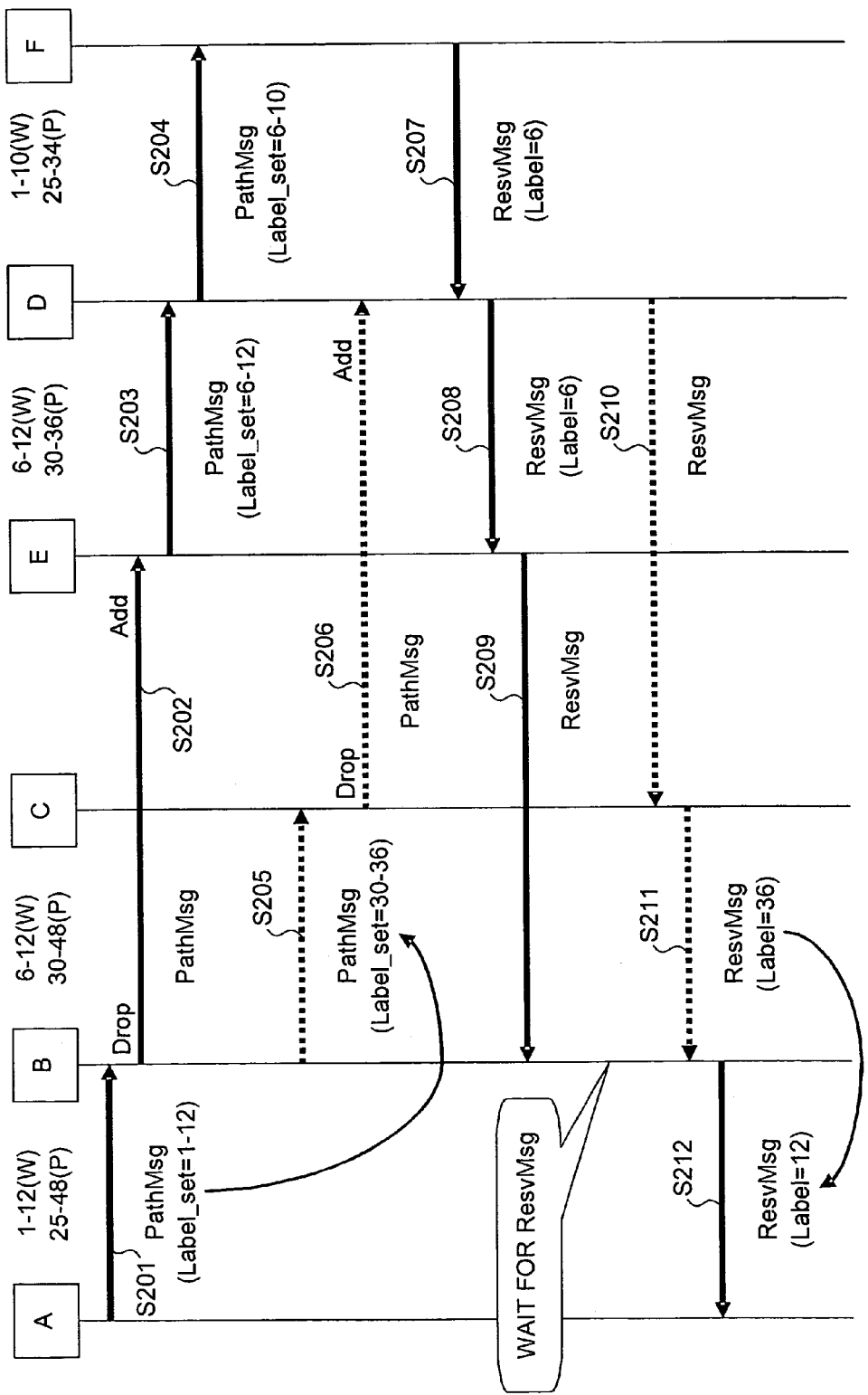

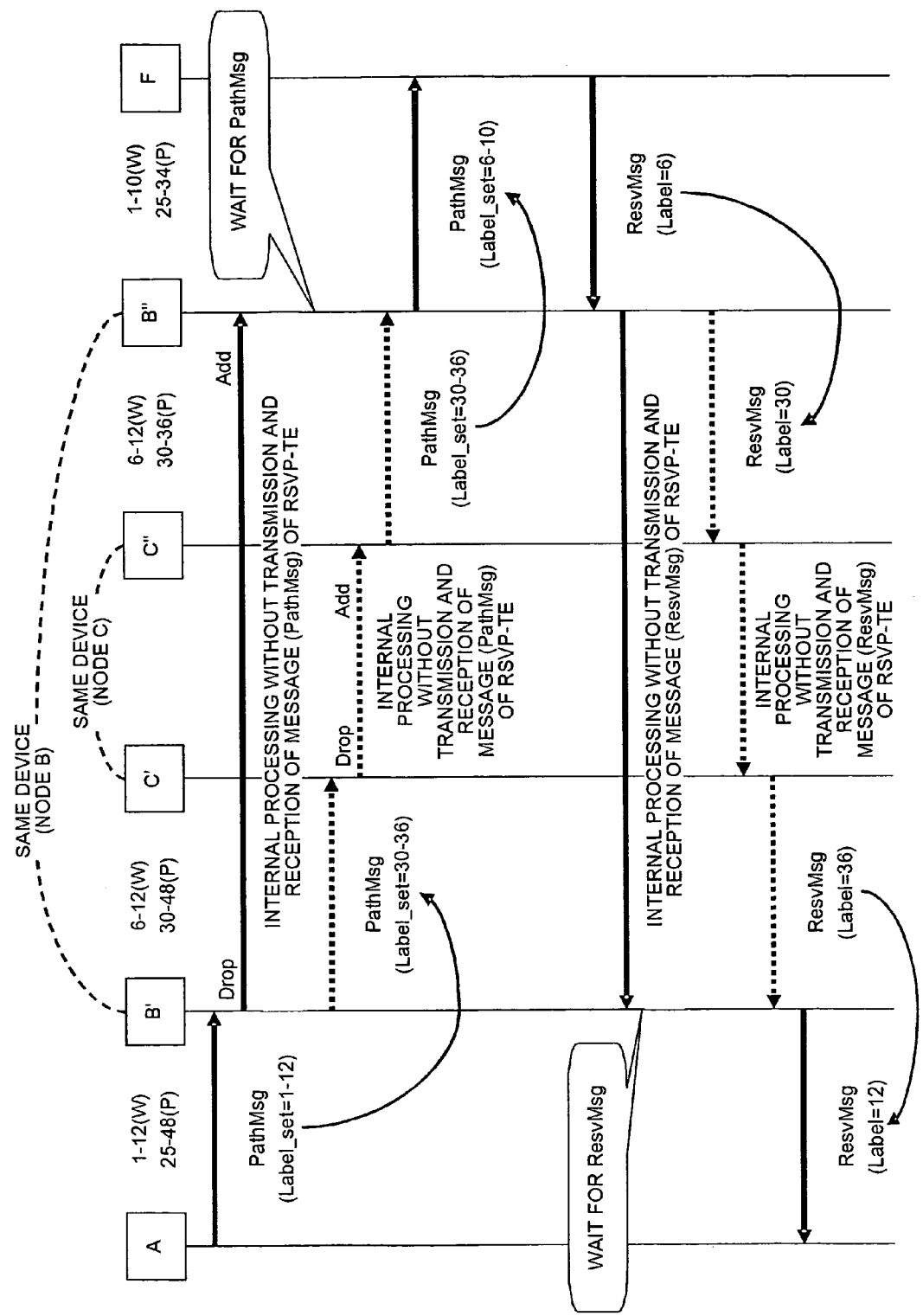

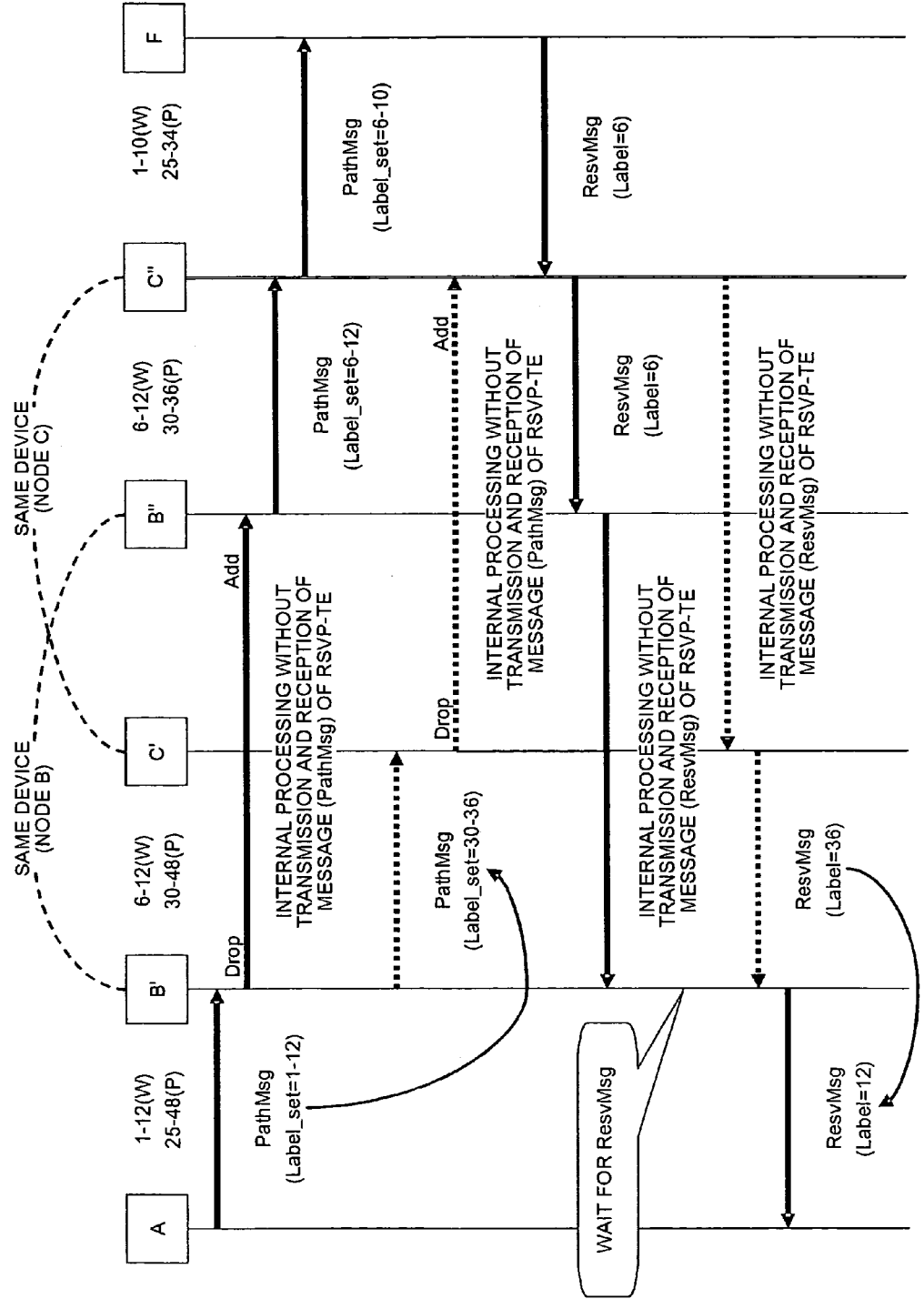

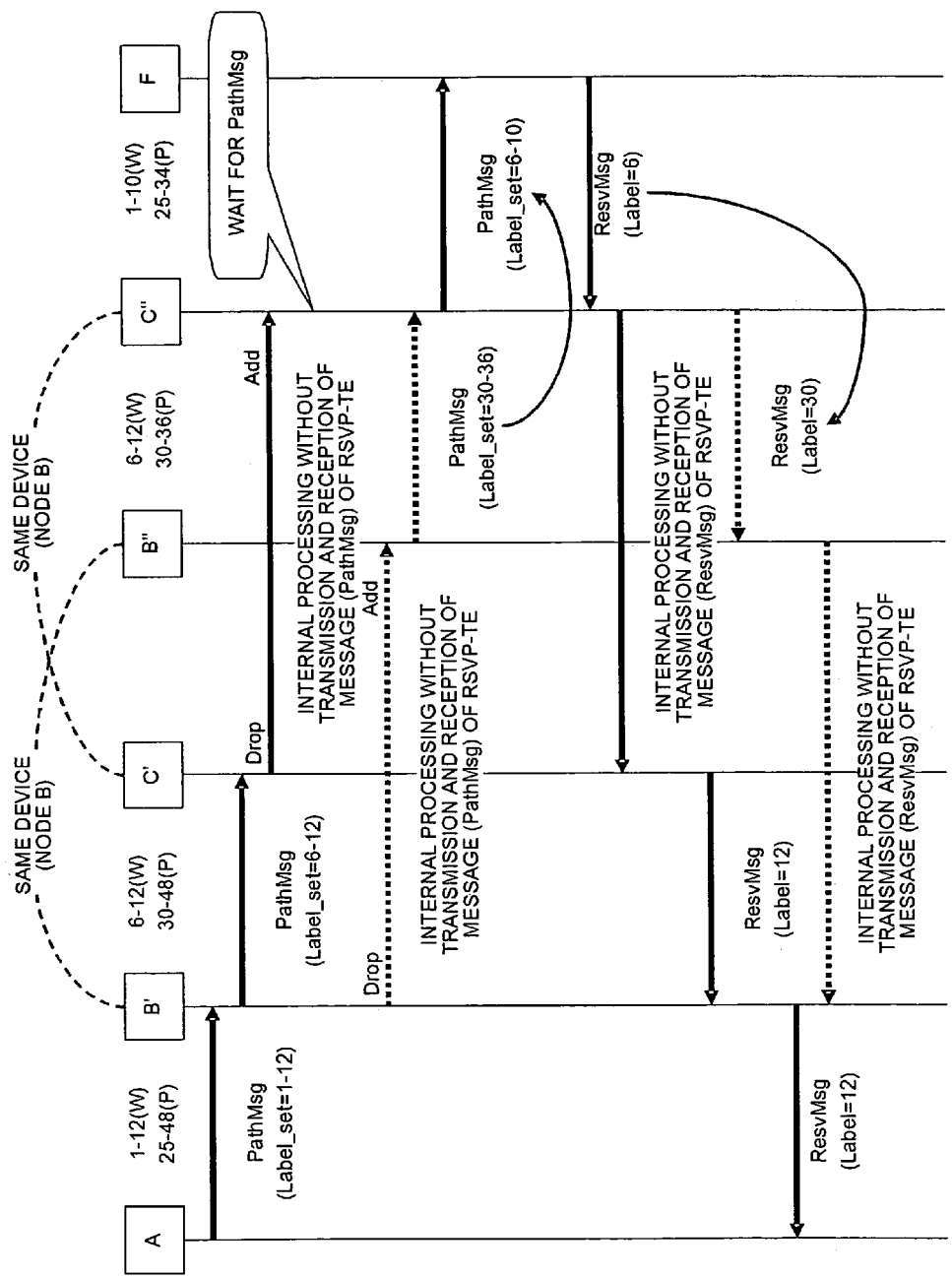

TRANSMISSION DEVICE AND LABEL ALLOCATION METHOD

BACKGROUND OF THE INVENTION

1. Field of the Invention

The present invention relates to a transmission device and a label allocation method for allocating a label having a predetermined relation between a main route and a protection route based on an autonomous operation.

2. Description of the Related Art

In recent years, a multi-protocol label switching (MPLS) as a route control protocol of a label switching and a signaling protocol are becoming popular. According to the label switching, an identification code called a label is attached to a frame (a packet), and a route is controlled using this label. The label needs to be allocated to each path in advance. In a large scale network, load of allocating the labels by an administrator increases.

When the signaling protocol is used, a node (a transmission device) such as a router and a switch that constitute the network, autonomously allocate the labels to the paths, thereby substantially decreasing the load on the administrator. Because paths can be established without requiring manpower, additionally required paths can be established promptly. As a representative signaling protocol, there is a Resource Reservation Protocol-Traffic Extension (RSVP-TE) prescribed in D. Awduche, L. Berger, D. Gan, T. Li, V. Srinivasan, G. Swallow, "RSVP-Te: Extensions to RSVP for LSP Tunnels", [online], December 2001, retrieved from the Internet (hereinafter, "Reference 1").

FIG. 32 is a diagram to explain an outline of label allocation-based on signaling. As shown in FIG. 32, the allocation of labels based on signaling is achieved by exchanging a connection establishment request message (Path message, hereinafter, "PathMsg") and a connection establishment response message (Resv message, hereinafter, "ResvMsg") between an ingress node as a starting point and an egress node as a terminal end.

PathMsg is a message for requesting the establishment of a path, and includes route information known as explicit route object (ERO), requested band information, and the like. ResvMsg is a message for notifying a label allocated by a downstream node to an upstream node.

A process of the signaling is as follows. The ingress transmits a PathMsg, which includes the ERO as a route till the egress, and the requested band information, to an adjacent node. The PathMsg transmitted by the ingress is transferred to the egress based on the ERO.

When the PathMsg reaches the egress, the egress establishes a path between the adjacent upstream node to meet the requirement of the PathMsg, and notifies an allocated label to the upstream node using a ResvMsg. The establishment of a path and the notification of a label using the ResvMsg are carried out sequentially in the upstream direction. When the ResvMsg reaches the ingress, the entire path is established, and all the labels are determined, therefore communication can be carried out using this path.

Usually, labels allocated to the nodes have different values. However, these labels can be standardized. To standardize the labels, a function of limiting a label is used. FIG. 33 is a diagram to explain label allocation using a label limit function. When the label limit function is used, a PathMsg transmitted includes a label set within the message. The label set is information indicating that a label is to be selected from a range of labels. Each time when the PathMsg is transferred, a label that is already used in the node is excluded, thereby narrowing the selection range.

In the example shown in FIG. 33, the ingress assigns 1-16 as a label set. This value is narrowed each time when the PathMsg is transferred. When the PathMsg reaches the egress, this value becomes 8-10. This value indicates that labels within this range are not used by any of the nodes between the ingress and the egress.

The egress allocates a label from this range, and notifies the allocated label to the adjacent upstream node using the ResvMsg. The upstream node allocates the same label as that notified from the downstream node, and notifies the label to the next upstream node. In this way, the label of the common value is allocated to all the nodes between the ingress and the egress.

MPLS is extended to Generalized Multi-Protocol Label Switching (GMPLS), and the GMPLS is applied to a ring network using an optical fiber such as a Synchronous Optical Network (SONET), in which extension of the function of the RSVP-TE is considered. The SONET and the like have a redundant mechanism called a ring protection. The main purpose of the extension is to effectively use this redundant mechanism. For details, see: Louis Berger, Igor Bryskin, Dimitri Papadimitriou, Adrian Farrel, "GMPLS Based Segment Recovery", [online], October 2004, retrieved from the Internet (hereinafter, "Reference 2").

However, even when the extended RSVP-TE function is used, sometimes this cannot sufficiently support the redundant mechanism such as the SONET. When communication is carried out over a SONET ring of a multi-ring configuration, generally, a protection route is set in addition to the main route. In this case, in order to automatically switch for the main route to the protection route at the time of trouble, a predetermined relation needs to be established between a channel (labels) for the main route and a channel (labels) for the protection route.

When the extended RSVP-TE function is used, labels can be allocated to the main route and the protection route in one signaling, but a relation cannot be established between the two routes. Instead of using the signaling, an administrator can manually set a route. However, in a large scale network, the load on the administrator increases, and a new path cannot be established promptly.

SUMMARY OF THE INVENTION

It is an object of the present invention to at least solve the problems in the conventional technology.

According to one aspect of the present invention, a transmission device that controls a route according to a label switching, in a network having a main route and a protection route that protects the main route, includes a controller that reflects a label limit information included in a connection establishment request message for the main route into a label limit information of a connection establishment request message for the protection route, when the transmission device is positioned at a branch between the main route and the protection route, and when allocation of a related label, that is a label that relates the main route and the protection route, is necessary.

According to another aspect of the present invention, a label allocation method in a network, which has a main route and a protection route that protects the main route, and which executes route control based on a label switching, includes reflecting, performed by a transmission device positioned at a branch between the main route and the protection route, including reflecting a label limit information included in a connection establishment request message for the main route into a label limit information included in a connection establishment request message for the protection route, when allocation of a related label, that is a label that relates the main route and the protection route, is necessary; waiting, performed by the transmission device, including waiting for a connection establishment response message for the protection route, after receiving a connection establishment response message for the main route corresponding to the connection establishment request message; acquiring, performed by the transmission device, including acquiring label limit information allocated to the protection route, from the connection establishment response message for the protection route; and allocating, performed by the transmission device, including allocating a label related to the label limit information acquired, to the main route.

According to still another aspect of the present invention, a label allocation method in a network, which has a main route and a protection route that protects the main route, and which executes route control based on a label switching, includes waiting, performed by a transmission device positioned at a merge between the main route and the protection route, including waiting for a connection establishment request message for the protection route, after receiving a connection establishment request message for the main route, when allocation of a related label, that is a label that relates the main route and the protection route, is necessary; reflecting, performed by the transmission device, including reflecting a label limit information included in the connection establishment request message for the protection route into a label limit information included in the connection establishment request message for the main route; acquiring, performed by the transmission device after waiting for the connection establishment response message for the main route, including acquiring a label limit information allocated to the main route from a connection establishment response message for the main route; and allocating, performed by the transmission device, including allocating a label related to the label limit information acquired, to the protection route.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2B is a sequence diagram of a process procedure when the label allocation system according to the present invention is applied to the network shown in FIG. 2A;

FIG. 3B is a sequence diagram of a process procedure when the label allocation system according to the present invention is applied to the network shown in FIG. 3A;

FIG. 5B is a sequence diagram of a process procedure when the label allocation system according to the present invention is applied to the network shown in FIG. 5A;

FIG. 6B is a sequence diagram of a process procedure when the label allocation system according to the present invention is applied to the network shown in FIG. 6A;

FIG. 7B is a sequence diagram of a process procedure when the label allocation system according to the present invention is applied to the network shown in FIG. 7A;

DETAILED DESCRIPTION OF THE PREFERRED EMBODIMENTS

Exemplary embodiments of the present invention will be explained in detail below with reference to the accompanying drawings. The principle of the present invention, followed by three embodiments of the present invention, is explained.

Application of a transmission device and a label allocation method according to the present invention to a network of a multi-ring configuration of a SONET is explained below. However, the application range of the present invention is not limited to the network of a multi-ring configuration of a SONET.

Figure 34:
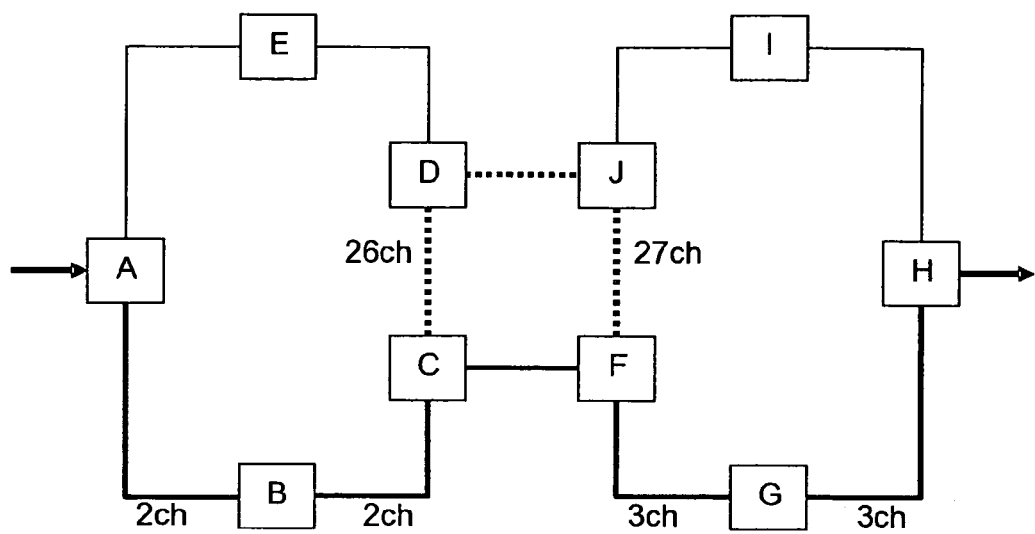
FIG. 34 is a diagram to explain a constraint of a label allocation in a multi-ring.

A constraint of a label allocation in a multi-ring is explained first. FIG. 34 is a diagram to explain a constraint of a label allocation in a multi-ring. In a network shown in FIG. 34, two ring-shaped networks are connected with two routes. A ring formed by connecting nodes A to E, and a ring formed by connecting nodes F to J are protected by a bidirectional line switched ring (BLSR).

Two routes, including a route formed by connecting node C and node F, and a route formed by connecting node D and node J, are provided between the two rings. When a trouble occurs in one route, the other route can be used to carry out communication.

When it is necessary to establish a connection from the node A to the node H via the nodes B, C, F, and G, generally, a protection route is secured by connecting the nodes C, D, J, and F, in addition to the main route that connects the above nodes. By securing this protection route, communication can be maintained by switching the path of the node C to the node F to the protection route, in case of any problem between the node C and the node F.

When there is trouble between the node C and the node F, in order to make the node C and the node F autonomously switch the communication route, a certain relation needs to be established between channels for the main route and the protection route, in advance. Assume that each ring has 48 channels. One half, 24 channels, is allocated to the entire main route, and a channel obtained by adding 24 to the channel for the main route needs to be allocated to the entire protection route. Channels are allocated to each ring independently. A channel of any value can be allocated to a juncture between the rings.

In the example shown in FIG. 34, a channel 2 is allocated to the main route that connects the nodes A, B, and C. A channel 26 is allocated to the nodes C and D as the protection route in the same ring. In the other ring, a channel 3 is allocated to the main route that connects the nodes F, G, and H. A channel 27 is allocated to between the nodes J and F as the protection route in the same ring. Any channel (not shown in FIG. 34) can be allocated to a path between the node C and the node F, and to a path between the node D and the node J.

When the GMPLS is applied to the SONET, a channel corresponds to a label for controlling the route. It is considered whether a label (a channel) as shown in FIG. 34 can be allocated using the RSVP-TE.

In order to allocate a label that is common to the channel between the nodes A and C and the channel between the nodes F and H, the label limit function can be used. For establishing a path between the nodes A and H, when the label limit function is used in a general method, a common channel is allocated to the nodes A to H on the whole. Alternatively, to establish a path between the nodes A and H, when a label set is once deleted from the PathMsg at the node C as a DROP node of the ring at the starting side, and when a new label is added to the node F as an ADD node of the ending side, a label that is common to the nodes A to C and a separate label that is common to the nodes F to H can be allocated respectively.

In order to allocate a label to the protection route connecting the nodes C, D, J, and F simultaneously with the allocation of a label to the main route, the expansion function described in the Reference 2 can be used. However, even when this technique is used, a state of idle labels in the protection route cannot be obtained from the node in the main route. Therefore, a relation cannot be established between the label for the main route and the label for the protection route. Consequently, based on the conventional signaling technique of the RSVP-TE, each node cannot autonomously allocate a label as shown in FIG. 34.

Figure 1:
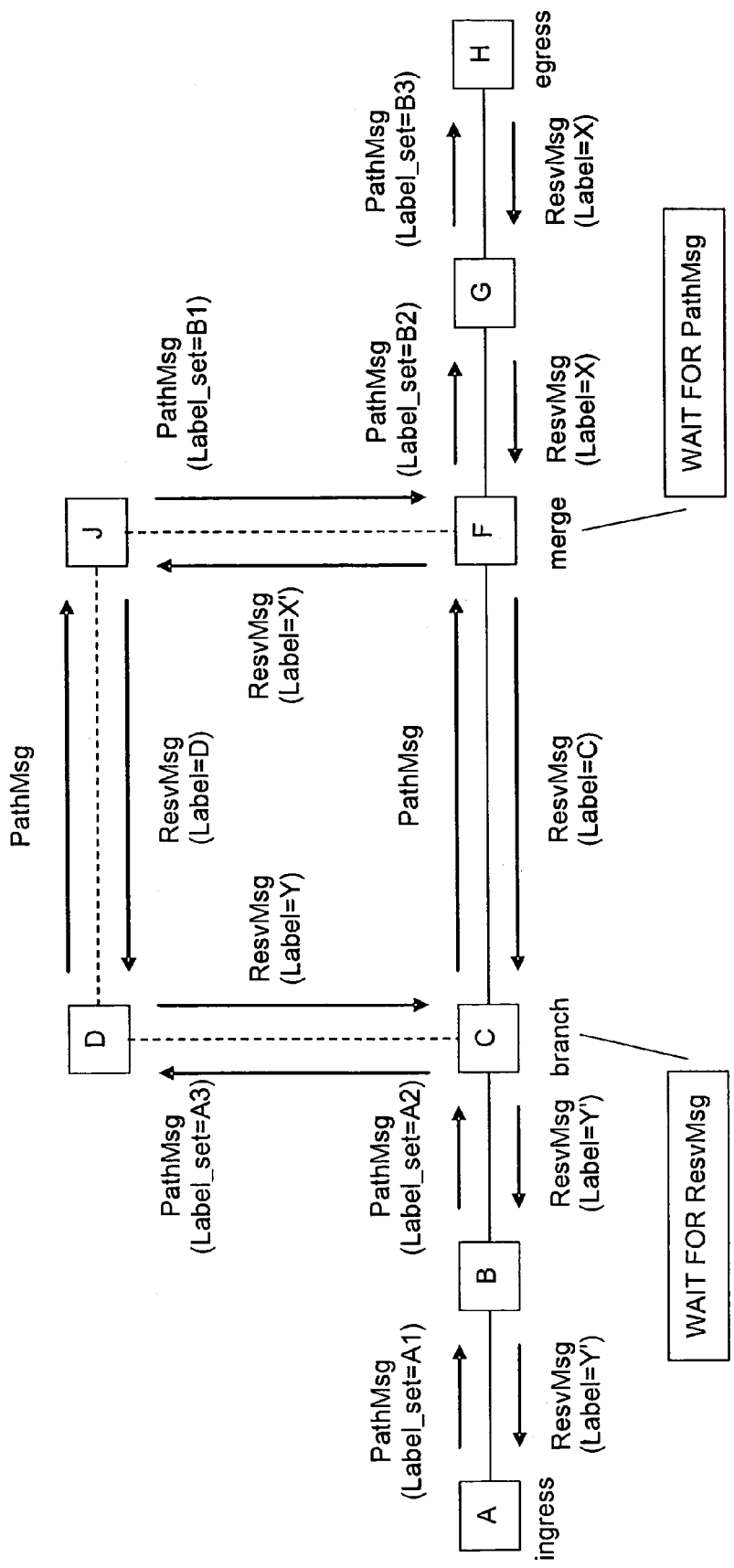
FIG. 1 is a diagram to explain a principle of a label allocation system according to the present invention.

The principle of a label allocation system according to the present invention is explained next. FIG. 1 is a diagram to explain a principle of the label allocation system according to the present invention. In FIG. 1, only the nodes concerning a communication route are extracted from the network of the multi-ring shown in FIG. 34.

In order to establish a path, the node A as an ingress generates a PathMsg in which a route from the node A to the node H is set, and transmits the PathMsg to the adjacent node B. In this PathMsg, in order to allocate a common label, a label set A1 that indicates unused channels of the node A is also set. The node B receives the PathMsg, takes a logical product of its own unused channels and the label set A1, and narrows down the set of unused channels. The node B sets a result of the narrowed down unused channels into the PathMsg as a label set A2, and transmits the PathMsg to the node C.

The node C as a DROP node of the ring at the starting side deletes the label set from the received PathMsg, and transfers the PathMsg to the node F. This is because the label for the main route does not need to be common to the protection route between the node C and the node F, and because the label set need not be handed over. The node C at a branch point between the main route and the protection route generates a new PathMsg to establish a path for the protection route, and transmits this PathMsg to the node D. The node that becomes a starting point for the protection route is called a branch node. In order to allocate a label common to the protection route, a label set generated by the branch is set to the PathMsg.

According to the conventional signaling process, a label set, set to the PathMsg that is transmitted from the node C to the node D, indicates unused channels of the node C that corresponds to the ingress for the protection route.

According to the label allocation system of the present invention, the node C takes a logical product of its own unused channels and the label set A2, and narrows down the unused channels. The node C substitutes the narrowed down result with idle channels for the protection route, based on a relation between the main route and the protection route. (For example, 24 is added to each element of the label set according to the above relation.) The node C transmits the substituted result to a PathMsg as a label set A3, and transmits the label set A3 to the node D.

When the branch node reflects the label set for the main route to the PathMsg for the protection route, a label allocated to the protection route can be guaranteed as an unused label in the relevant main route.

The node D as a DROP node of the ring at the starting side receives the PathMsg from the node C, deletes the label set from the received PathMsg, and transmits this PathMsg to the node J. This is because the label need not be common to the protection route between the node D and the node J, and because the label set need not be handed over. In order to allocate a common label to the protection route, the node J as an ADD node of the ring at the ending side sets its own unused channels into the received PathMsg as a label set B1, and transmits this PathMsg to the node F.

The node F, positioned at a merge point between the main route and the protection route, receives the PathMsg from the node C to establish a path for the main route, and receives the PathMsg from the node J to establish a path for the protection route. The node that becomes the end for the protection route is called a merge node.

According to the conventional signaling process, the merge node handles processes for a PathMsg of a main route and for a PathMsg of a protection route independently. The merge node receives the PathMsg for the main route, sets its own unused channels into this PathMsg as the label set, and immediately transfers the PathMsg to the next device. The merge node receives the PathMsg for the protection route, immediately establishes a path between itself and the upstream node, allocates a label, and notifies this label to the upstream node by a ResvMsg.

According to the label allocation system of the present invention, the merge node F waits for the two PathMsg. Allocation and response of labels to the PathMsg for the protection route is not performed until when a result of the allocation of a label for the main route is ascertained.

The node F substitutes values of the label set B1 included in the PathMsg for the protection route for a label list for the main route, based on a relation between the main route and the protection route (For example, 24 is subtracted from each element of the label set, according to the above relation). The node F takes a logical product of its own idle labels and the label set B1, narrows down the label set to B2, sets the label set into the PathMsg for the main route, and transfers the PathMsg to the node G.

When the merge node reflects the label set for the protection route to the PathMsg for the main route, a label allocated to the main route can be guaranteed as an unused label in the relevant protection route.

The node G receives the PathMsg from the node F, narrows down the label set, substitutes the label set B2 with a label set B3, and transfers the PathMsg to the node H. An egress node H receives the PathMsg, establishes a path between the node H and the node G based on the condition of the PathMsg, selects a label from the label set B3 (in this case, selects a label X), and notifies the label to the node G by a ResvMsg.

The node G receives the ResvMsg, establishes a path between the node G and the node F based on the condition of the received PathMsg, and allocates the label X notified by the ResvMsg to the path. The node G transfers the ResvMsg indicating that the label X is allocated, to the node F.

The merge node F receives the ResvMsg for the main route from the node G, establishes a path between the upstream node C for the main route and the node F, and allocates a label to the path from its own idle labels. Because a label set is not set to the PathMsg transmitted by the node C, an optional label can be allocated to the path.

The node F also allocates a label to the protection route. A label to be allocated to the protection route is not selected from the label set included in the PathMsg received from the node J. Instead, the value of the label notified by the ResvMsg received from the node G is substituted with another value for the label for the protection route, based on the relation between the main route and the protection route. (For example, 24 is added to this label, according to the above relation.)

As explained above, the merge node does not allocate a label to the protection route until the allocation of a label to the main route is ascertained. Further, the merge node converts the value of the label allocated in the main route to obtain another value. The merge node allocates this converted value to the protection route. With this arrangement, labels can be properly allocated to the main route and the protection route and have a relation to each other, in the ring at the ending side.

The node J receives the ResvMsg from the node F, establishes a path between the node J and the node D, and allocates a label to the path from its own idle labels. Because a label set is not set to the PathMsg transmitted by the node D, an optional label can be allocated to the path. The node D receives the ResvMsg, establishes a path between the node D and the node C, allocates a label (in this case, allocates a label Y) to the path from the label set A3 included in the received PathMsg, and notifies the label to the node C via the ResvMsg.

The branch node C receives the ResvMsg notifying the label for the main route from the node F, and receives the ResvMsg notifying the label for the protection route from the node D. According to the conventional signaling process, the ResvMsg for the main route and the ResvMsg for the protection route are processed independently.

According to the label allocation system of the present invention, the branch node C waits for the two ResvMsg. After receiving the two ResvMsg, the node C substitutes the value of the label notified by the ResvMsg for the protection route received from the node D for the label for the main route, based on the relation between the main route and the protection route. (For example, 24 is subtracted from the received label value, according to the above relation.) The node C allocates this label to the path between the node C and the node B as the main route.

As explained above, the branch node waits for the allocation of a label to the main route until the allocation of a label to the protection route is ascertained. Further, the branch node converts the value of the label allocated in the protection route to obtain another value, and allocates this converted value to the main route. With this arrangement, labels can be properly allocated to the main route and the protection route, and have a relation to each other, in the ring at the starting side.

The node B receives the ResvMsg from the node C, establishes a path between the node B and the node A based on the condition of the received PathMsg, allocates a label Y' set in the received ResvMsg to this path, and notifies the label to the node A by the ResvMsg. In this way, the label allocation system according to the present invention can allocate labels as shown in FIG. 34, based on the autonomous operation of each node.

Figure 2A:
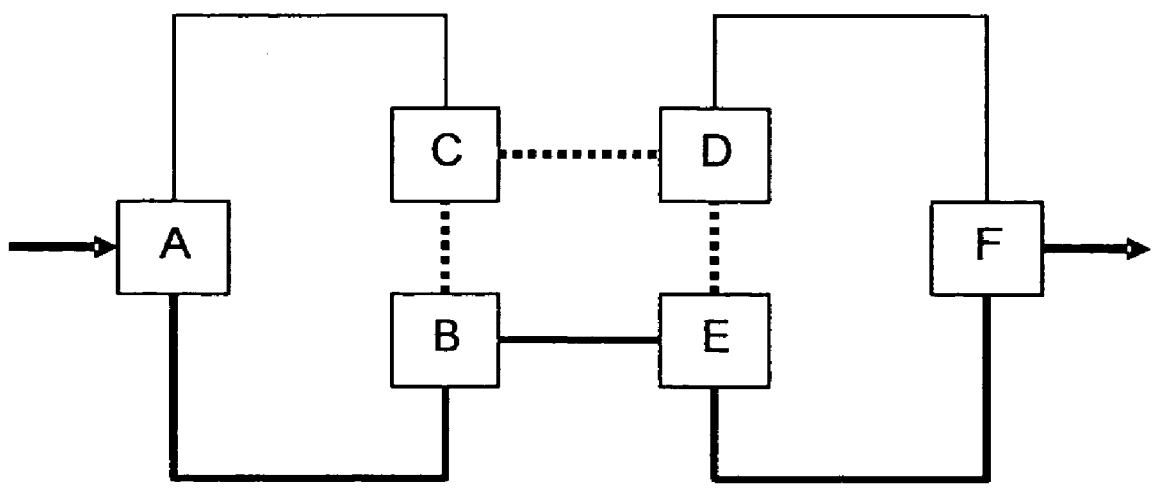
FIG. 2A is a sample diagram of one example of a network to which the label allocation system according to the present invention is applied.

A process procedure of the label allocation system according to the present invention is explained in detail based on examples. FIG. 2A is a sample diagram of one example of a network to which the label allocation system according to the present invention is applied. As shown in FIG. 2A, this network includes two rings that are connected to each other using two routes. A main route is formed by connecting the nodes A, B, E, and F. A protection route is formed by connecting the nodes B, C, D, and E. Idle labels between the nodes are as shown in Table 1.

TABLE 1

| | Usable channels | |
|---|---|---|
| | Current channels | Standby channels |
| A-B | 1-12 | 25-48 |
| B-C | 6-12 | 30-48 |
| C-D | — | — |
| B-E | — | — |
| D-E | 6-12 | 30-36 |
| D-F | 1-10 | 25-34 |
| E-F | 1-10 | 25-34 |

FIG. 2B is a sequence diagram of a process procedure when the label allocation system according to the present invention is applied to the network shown in FIG. 2A. As shown in FIG. 2B, the ingress node A sets its own idle labels 1-12 in the main route into a PathMsg as a label set, and transmits this PathMsg to the node B (step S101). The branch node B deletes the label set from the received PathMsg, and transfers this PathMsg to the next node E for the main route (step S102). The branch node B deletes the label set because the path between the node B and the node E corresponds to a juncture between the two rings.

The node B takes a logical product of 25-36, which is obtained by converting the label set included in the received PathMsg into a value for the protection route, and 30-48 that are its own idle labels in the protection route. The node B sets the obtained value 30-36 into the PathMsg as a label set for the protection route, and transmits this PathMsg to the node C (step S103). The node C receives the PathMsg, deletes the label set, and transfers this PathMsg to the node D (step S104). The node C deletes the label set because the path between the node C and the node D corresponds to a juncture between the two rings.

The node D receives the PathMsg, sets its own idle labels 30-36 in the protection route into this PathMsg as a label set, and transmits this PathMsg to the node E (step S105). When the merge node E receives one of the two PathMsg for the main route and the protection route, the node E waits for the other PathMsg. Upon receiving both the PathMsg, the node E converts the label set included in the received PathMsg for the protection route into 6-12 for the main route, and takes a logical product of 6-12 and its own idle labels 1-10 in the main route, thereby obtaining labels 6-10. The node E sets the obtained 6-10 into the PathMsg as a label set for the main route, and transmits this PathMsg to the node F (step S106). At this time, the node E waits for the allocation of a label to the protection route.

Upon receiving the PathMsg, the egress node F establishes a path between the node F and the node E, and selectively allocates a label (6 in this example), to this path from the label set included in the PathMsg. The node F transmits a ResvMsg set with the label 6 to the node E (step S107).

Upon receiving the ResvMsg for the main route, the merge node E establishes a path between the node E and the node B, allocates a label for the main route unused by itself, and notifies this label to the node B via the ResvMsg (step S108). The node E further converts a value of the label included in the received ResvMsg for the main route into a label for the protection route (a label 30 in this example), allocates this label to the path between the node E and the node D, and notifies this label to the node D via the ResvMsg (step S109).

Upon receiving the ResvMsg, the node D establishes a path for the protection route between the node D and the node C, and allocates a label for the protection route unused by itself. The node D notifies the allocated label to the node C by the ResvMsg (step S110). Upon receiving the ResvMsg, the node C establishes a path for the protection route between the node C and the node B, and selectively allocates a label (a label 36 in this example), to this path from the label set included in the received PathMsg. The node C transmits the ResvMsg set with the label 36 to the node B (step S111).

Upon receiving one of the two ResvMsg for the main route and the protection route, the branch node B waits for the other ResvMsg. Upon receiving both ResvMsg, the node B establishes a path for the main route between the node B and the node A, converts the value of the label included in the received ResvMsg for the protection route into a value 12 for the main route, and allocates 12 as the label. The node B notifies the allocated label to the node A via the ResvMsg (step S112). In this way, the paths are established, and the labels are allocated.

Figure 3A:
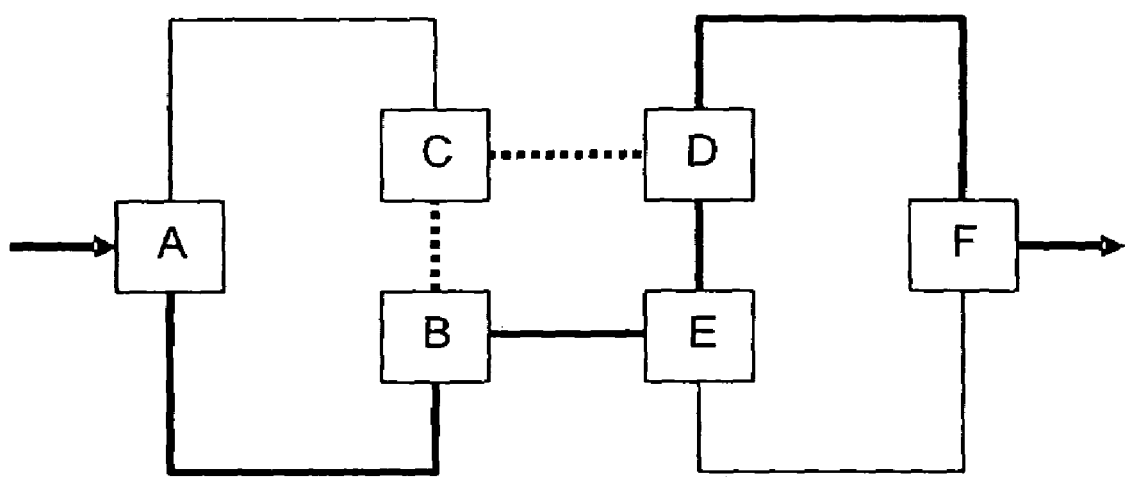
FIG. 3A is a diagram of another example of a network to which the label allocation system according to the present invention is applied.

FIG. 3A is a diagram of another example of a network in which the main route of the ring at the ending side is changed such that the route after the merge becomes the nodes E, D, and F connected together. In this case, a protection route is not present in the ring at the ending side. Therefore, as is clear by referring to FIG. 3B, it is not necessary to wait for the PathMsg at the merge.

Figure 4A:
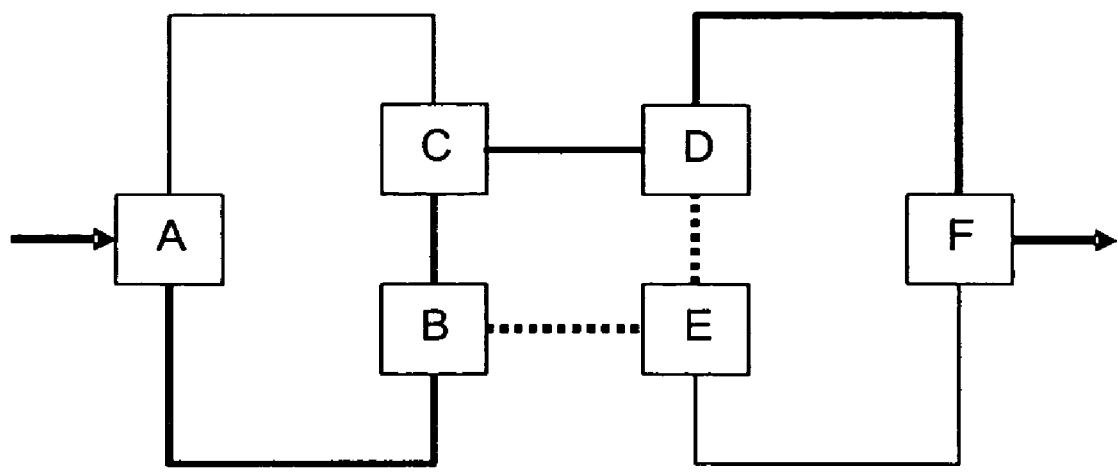
FIG. 4B is a sequence diagram of a process procedure when the label allocation system according to the present invention is applied to the network shown in FIG. 4A.
Figure 4B:
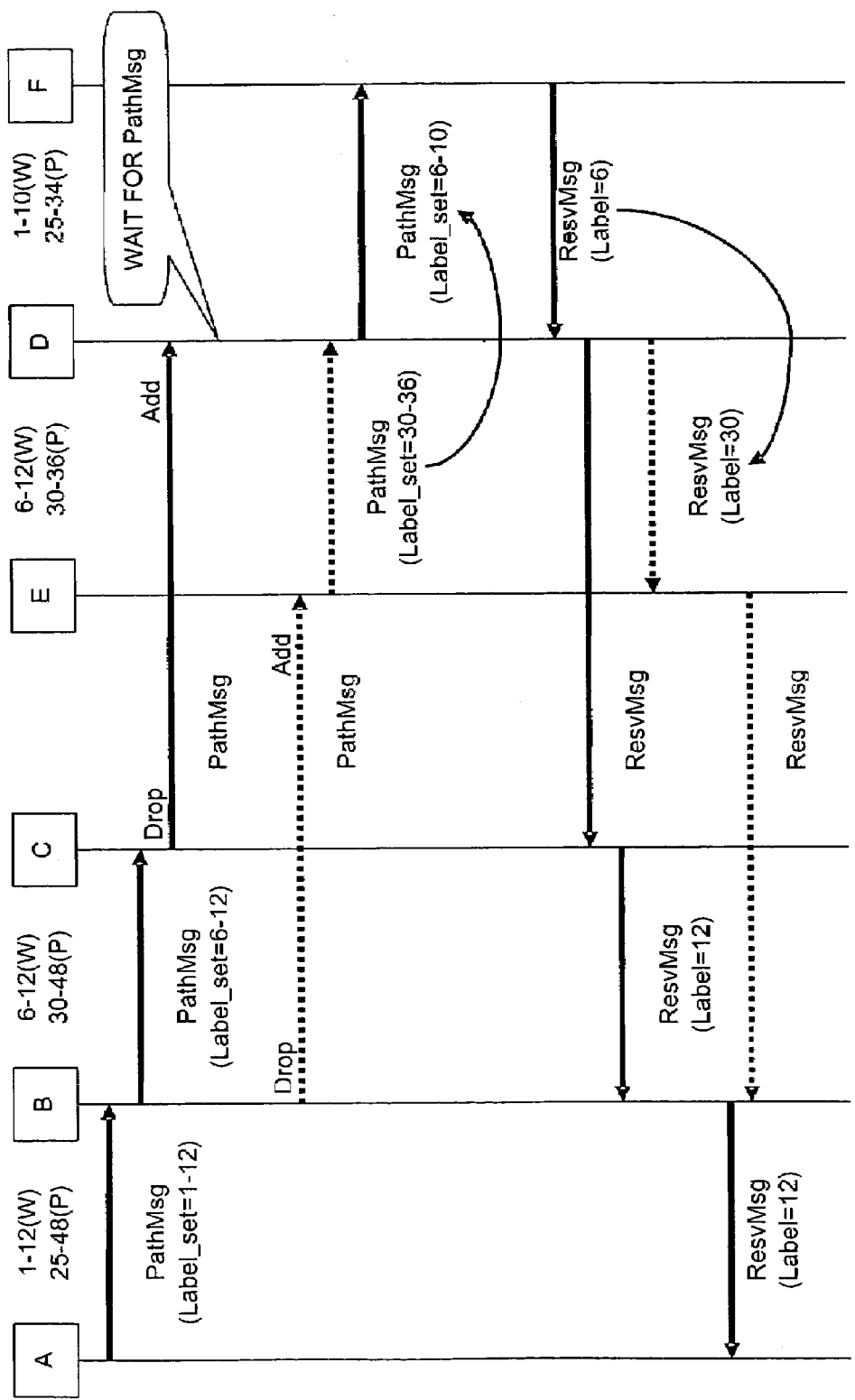

FIG. 4A is a diagram of another example of a network in which the main route of the ring at the starting side is changed such that the route before the branch becomes the nodes A, B, and C connected together. In this case, a protection route is not present in the ring at the starting side. Therefore, as is clear by referring to FIG. 4B, it is not necessary to wait for the ResvMsg at the branch.

Figure 5A:
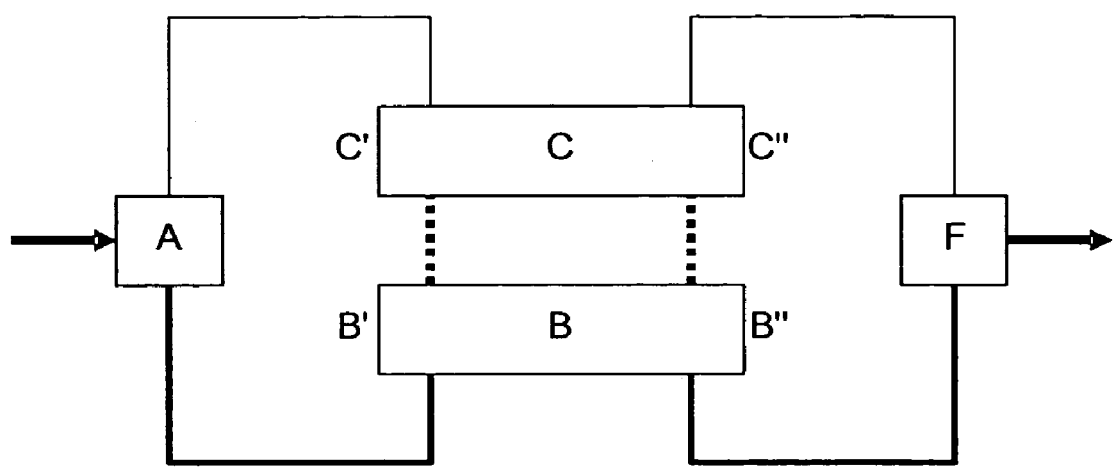
FIG. 5A is a diagram of another example of a network to which the label allocation system according to the present invention is applied.
Figure 6A:
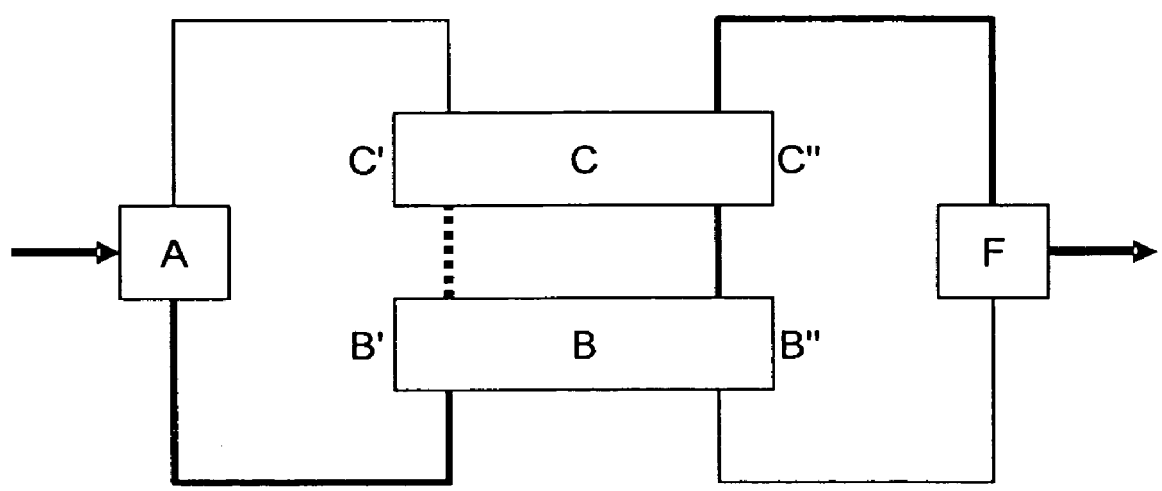
FIG. 6A is a diagram of another example of a network to which the label allocation system according to the present invention is applied.
Figure 7A:
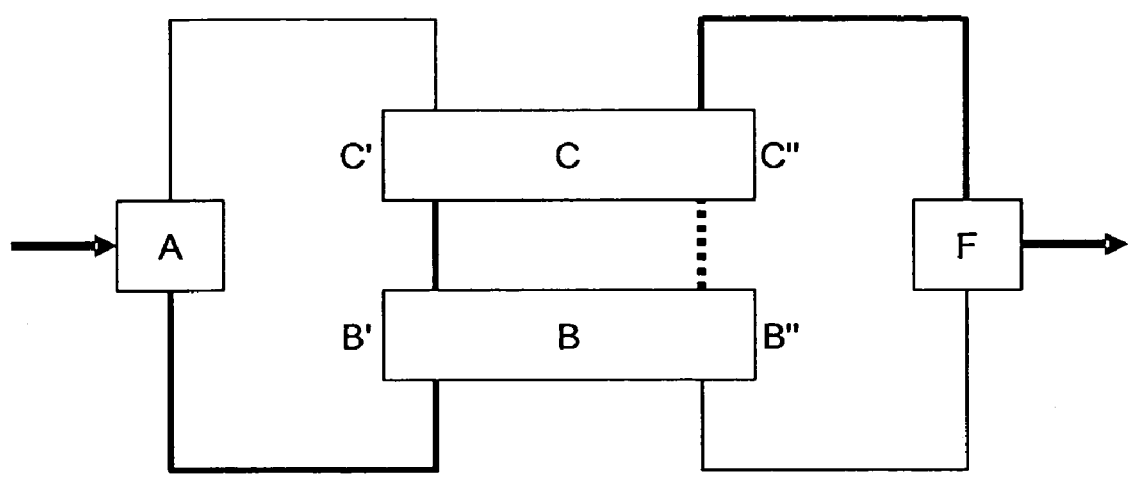
FIG. 7A is a diagram of another example of a network to which the label allocation system according to the present invention is applied.

FIG. 5A, FIG. 6A, and FIG. 7A are diagrams of examples of a network in which two rings are connected together with two nodes that can be connected to plural rings. One ring includes the nodes A, B, and C, and the other ring includes the nodes B, C, and F. The nodes B and C stride over the two rings respectively.

When allocating labels to the main route and the protection route in the above structures, when nodes that stride over the two rings are virtually operated as two devices, each node can autonomously establish a path and allocate a label to each path.

As is clear by referring to FIG. 5B, a process procedure similar to that shown in FIG. 2A can be used to set paths shown in FIG. 5A. As is clear by referring to FIG. 6B, a process procedure similar to that shown in FIG. 3A can be used to set routes shown in FIG. 6A. As is clear by referring to FIG. 7B, a process procedure similar to that shown in FIG. 4A can be used to set routes shown in FIG. 7A.

In FIG. 5B, FIG. 6B, and FIGS. 7B, B' and B", and C' and C" denote the same devices respectively. These reference symbols are differentiated to facilitate the understanding of the operation. In actual operation, messages of the RSVP-TE (PathMsg and ResvMsg) are not exchanged between the devices B' and B" and between the devices C' and C".

In the above explanation, while nodes that connect two rings are adjacent to each other, these nodes are not necessarily adjacently disposed. For example, in FIG. 2A, even if another node is present between the node B and the node C, the label allocation system according to the present invention can function properly.

As explained above, according to the label allocation system of the present invention, labels to be allocated to the main route and the protection route are related to each other by changing the conventional operation of the branch and the merge respectively. Therefore, in executing the label allocation system according to the present invention, the node that becomes the branch and the node that becomes the merge need to understand their own functions. Methods of making a node understand its own function are explained in the following embodiments.

Figure 8:
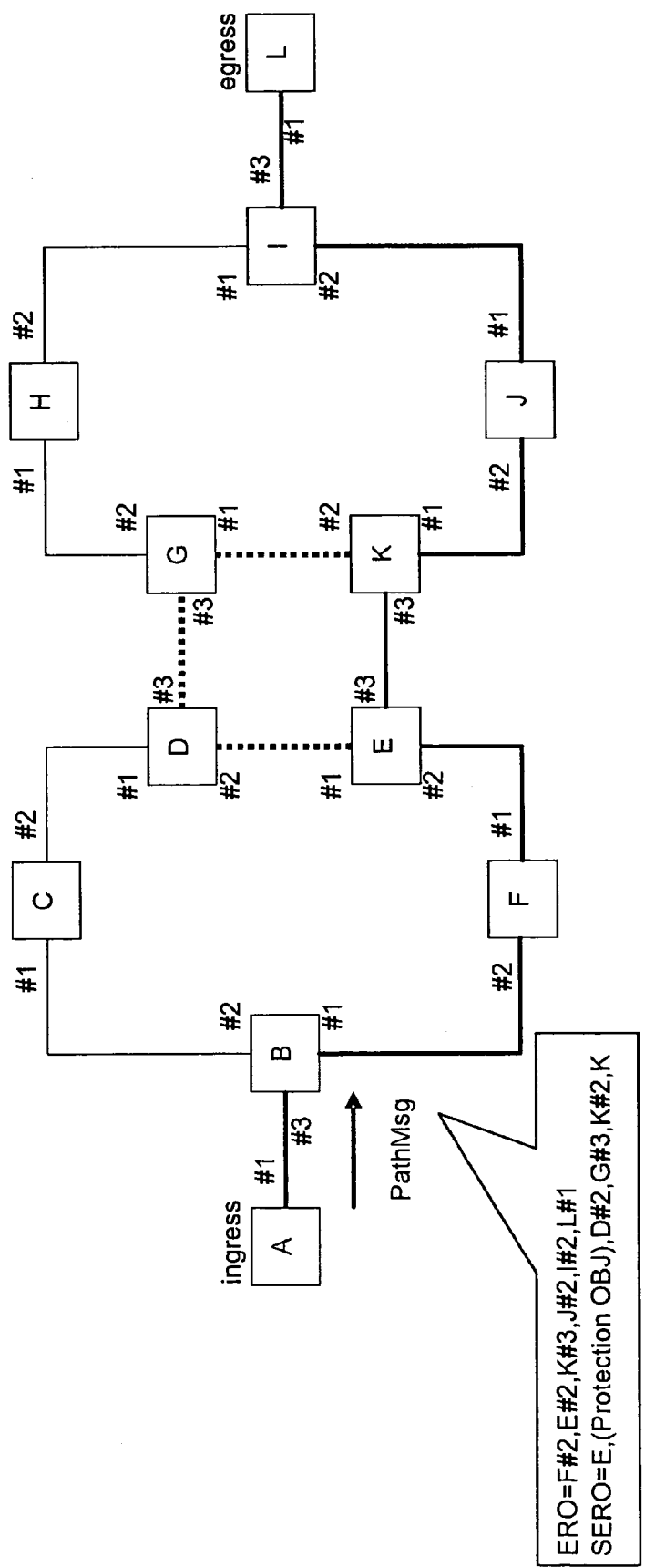
FIG. 8 is a diagram to explain route information in a PathMsg as an assumption of a first embodiment.

An assumption of a first embodiment is explained first. FIG. 8 is a diagram to explain route information in a PathMsg as the assumption of the present embodiment. In the present embodiment, a PathMsg that is issued from an ingress includes secondary explicit route object (SERO) as route information of a protection route, in addition to an ERO as route information of a main route. Each node in a network understands whether it is a branch or a merge or is neither of them, by referring to the SERO.

The SERO is one of extended functions described in the Reference 2, and explicitly indicates the protection route. As is clear from the example shown in FIG. 8, the head node of the SERO corresponds to a branch, and the tail node corresponds to a merge. In the specifications of the extended functions described in the Reference 2, in transmitting an output PathMsg for the main route from the branch, it is not required to keep the SERO that expresses this branch intact. However, in the present embodiment, in order to make the merge node recognize that it is a merge node, the output PathMsg for the main route transmitted from the branch must include the SERO transmitted from the ingress by necessity. Further, in the present embodiment, how the ingress obtains the information of the SERO is not specified.

Figure 9:
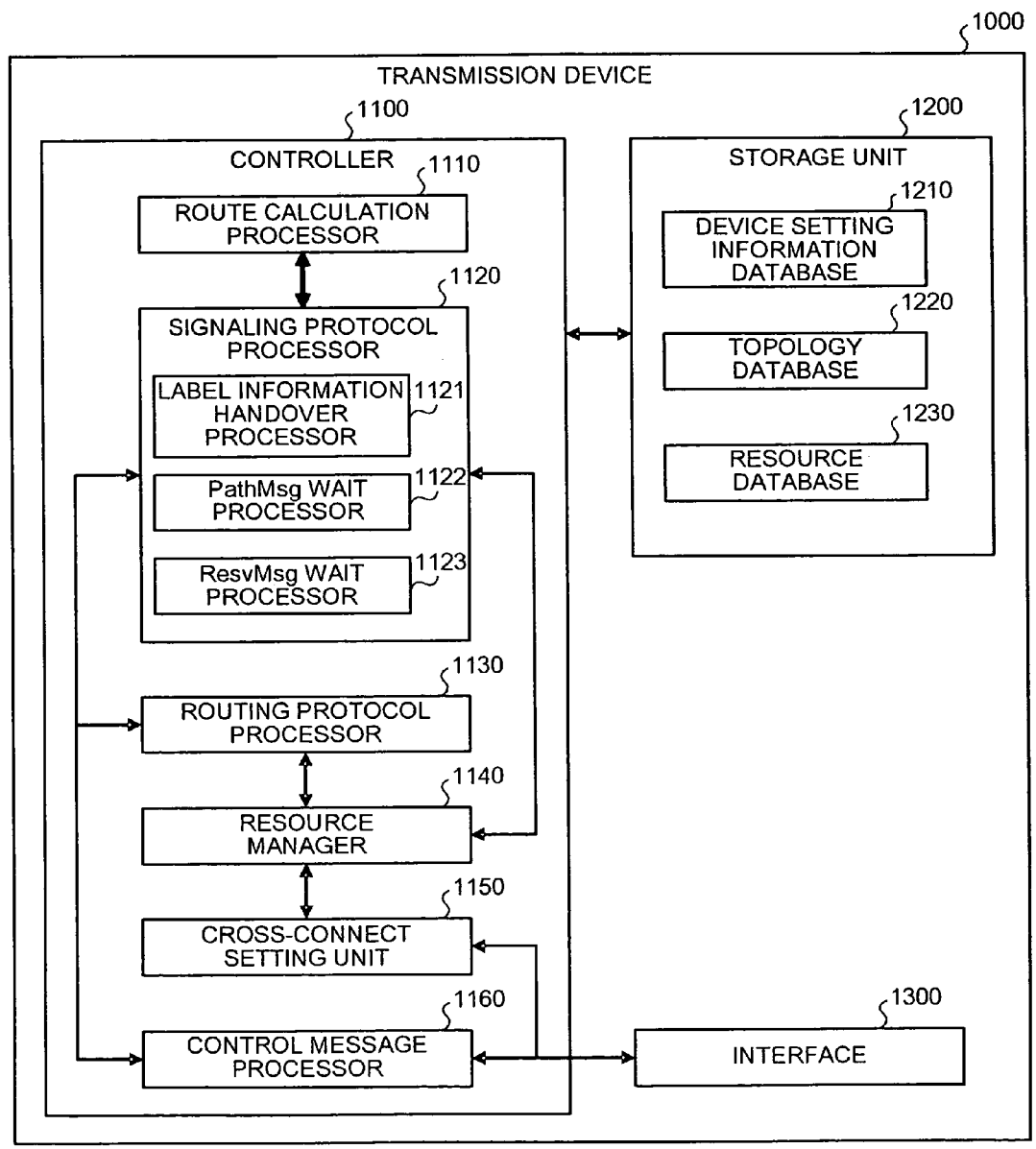
FIG. 9 is a functional block diagram of a configuration of a transmission device according to the present embodiment.

A structure of a node that executes the label allocation system according to the present embodiment is explained next. A node in a multi-ring is a transmission device having an interface such as an optical fiber. FIG. 9 is a functional block diagram of a configuration of the transmission device according to the present embodiment.

As shown in FIG. 9, a transmission device 1000 includes a controller 1100, a storage unit 1200, and an interface 1300. The controller 1100 controls the entire transmission device 1000, and includes a route calculation processor 1110, a signaling protocol processor 1120, a routing protocol processor 1130, a resource manager 1140, a cross-connect setting unit 1150, and a control message processor 1160. The route calculation processor 1110 calculates a shortest route in selecting a route.

The signaling protocol processor 1120 establishes a path and allocates a label, and includes a label information handover processor 1121, a PathMsg wait processor 1122, and a ResvMsg wait processor 1123. The label information handover processor 1121 converts the values of a label set and a label for the main route to those for the protection route, or converts the values of a label set and a label for the protection route to those for the main route, based on a relation between the main route and the protection route. The PathMsg wait processor 1122 executes a PathMsg wait process when the device is a merge. The ResvMsg wait processor 1123 executes a ResvMsg wait process when the device is a branch.

The routing protocol processor 1130 processes a routing protocol such as the Open Shortest Path First-Traffic Extension (OSPF-TE). The resource manager 1140 manages a resource such as an idle label. The cross-connect setting unit 1150 sets a combination of a connection of lines such as optical fibers that are connected to the interface 1300. The control message processor 1160 separates control messages received via the interface 1300, to the signaling protocol processor 1120 and the routing protocol processor 1130. The control message processor 1160 can be configured to obtain a control message from a control line provided separately from a data communication line.

The storage unit 1200 stores various kinds of information, and includes a device setting information database 1210, a topology database 1220, and a resource database 1230. The device setting information database 1210 stores various kinds of setting information concerning the transmission device 1000. The topology database 1220 stores configuration information of a network that includes the transmission device 1000. The resource database 1230 stores a state of various kinds of resources such as a label using state.

The interface 1300 exchanges data and the like with lines such as optical fibers.

Figure 10:
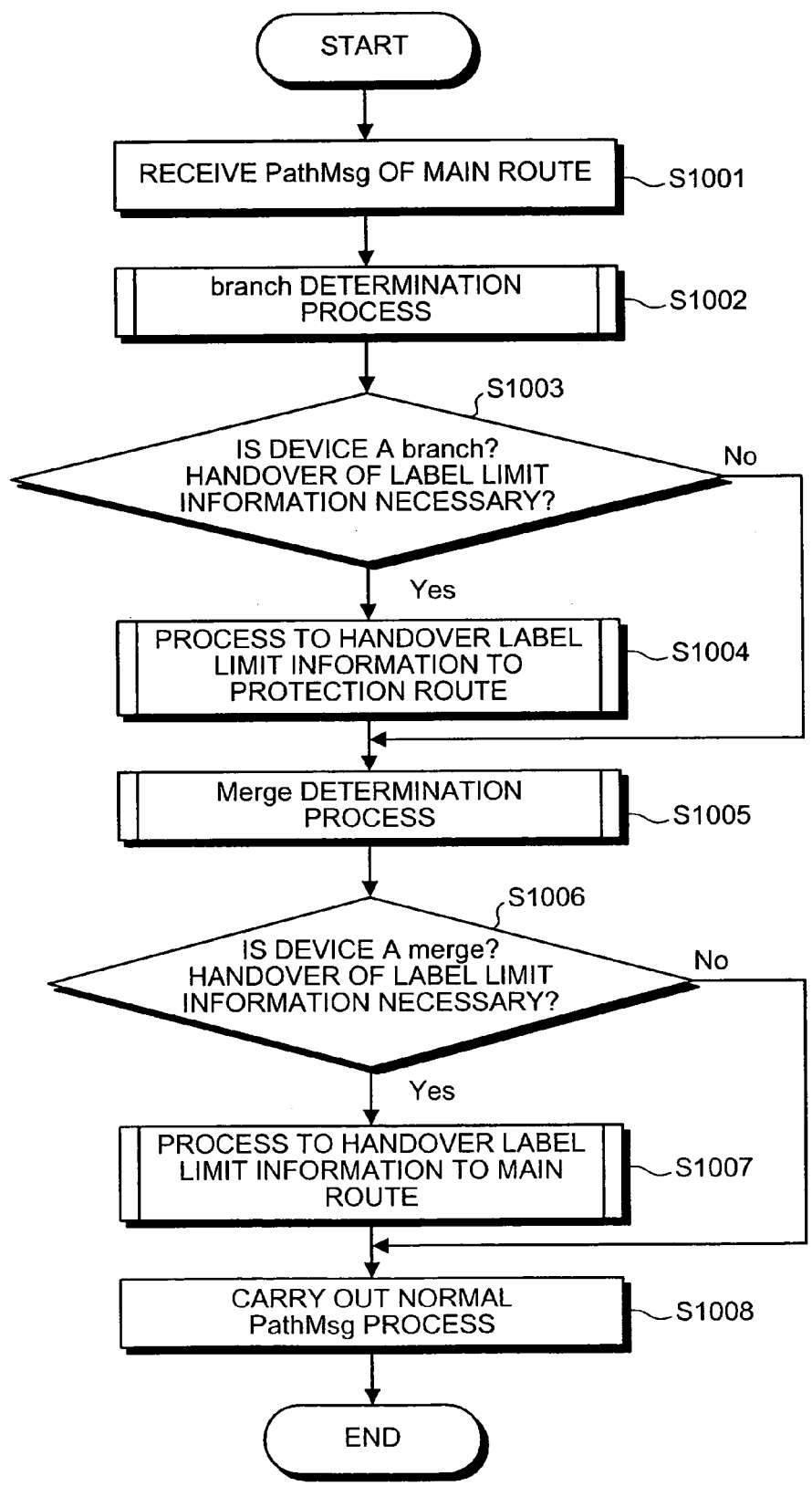
FIG. 10 is a flowchart of a process procedure when the transmission device shown in FIG. 9 receives a PathMsg.

A process procedure of the transmission device 1000 is explained next. FIG. 10 is a flowchart of a process procedure when the transmission device 1000 shown in FIG. 9 receives a PathMsg. As shown in FIG. 10, upon receiving a PathMsg of a main route (step S1001), the transmission device 1000 carries out a branch determination (step S1002), and checks whether the device is a branch, and also whether handover of label limit information to a protection route is necessary (step S1003). When it is determined that the device is a branch, and that the handover of label limit information to a protection route is necessary (Yes at step S1003), the transmission device 1000 hands over the label limit information to the protection route (step S1004).

The transmission device 1000 carries out a merge determination process (step S1005), and checks whether the device is a merge, and also whether handover of label limit information to a main route is necessary (step S1006). When it is determined that the device is a merge and also the handover of label limit information to a main route is necessary (Yes at step S1006), the transmission device 1000 hands over the label limit information to the main route (step S1007).

Upon completing the above process, the transmission device 1000 carries out a normal process related to a PathMsg (step S1008). The normal process refers to the process according to the RFC3471, RFC3473 (the GMPLS RSVP-TE basic specifications), and the RFC3946 (the SONET expansion specifications). For example, when the device is a branch, a process of starting a signaling of a protection route is also included in the normal process.

Whether a PathMsg is for a main route or for a protection route can be determined, for example, by referring to a P-bit of the protection object included in the PathMsg. In the Reference 2, it is prescribed that the P-bit is set to 0 when the PathMsg is for a main route, and the P-bit is set to 1 when the PathMsg is for a protection route. Upon receiving the PathMsg for the protection route, the transmission device 1000 carries out only the normal process related to the PathMsg.

Figure 11:
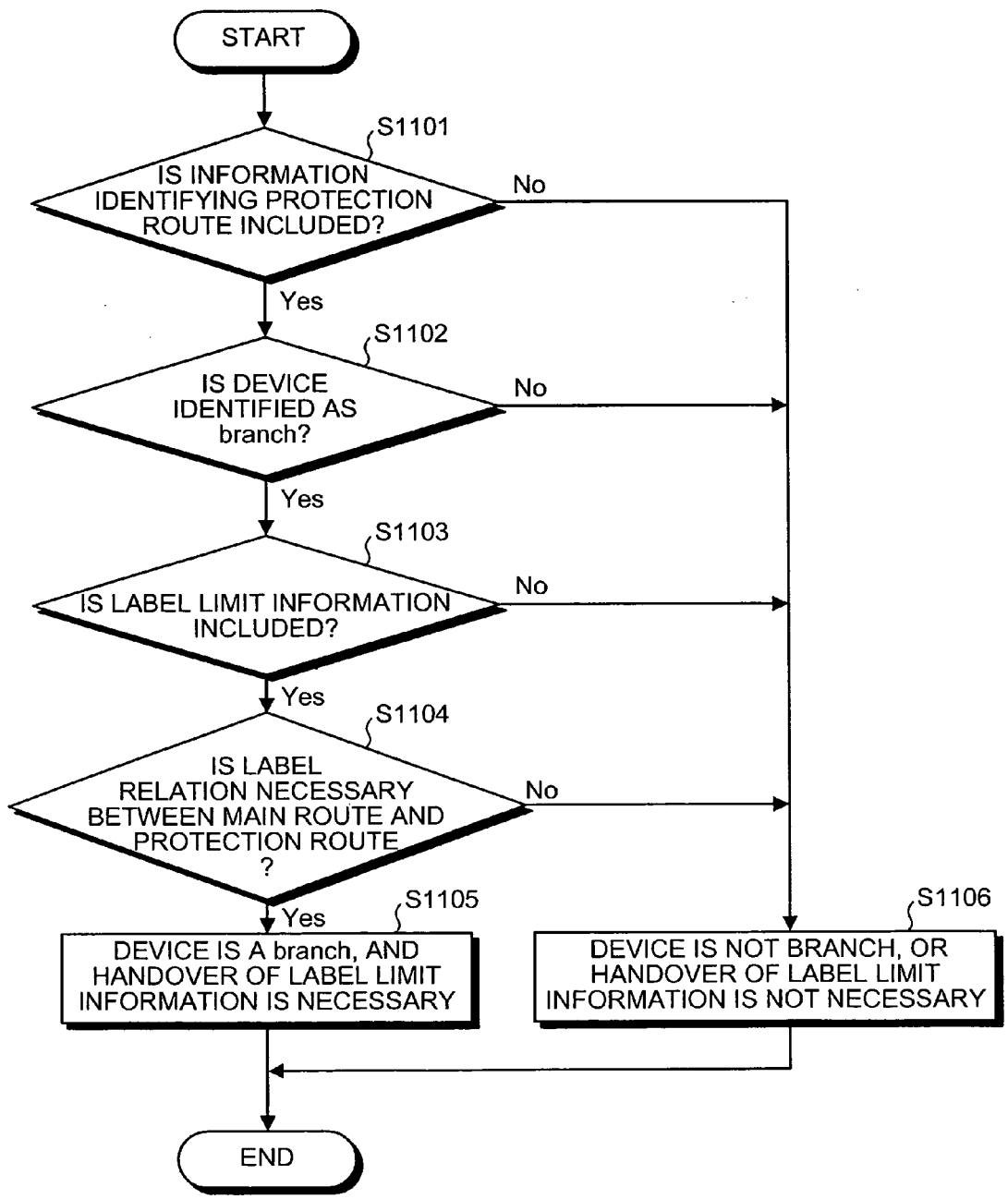
FIG. 11 is a flowchart of a process procedure of a branch determination process, shown in FIG. 10.

A process procedure of the branch determination process shown in FIG. 10 is explained next. FIG. 11 is a flowchart of the process procedure of the branch determination process shown in FIG. 10. When a PathMsg includes information that identifies a section of a protection route (for example the SERO) (Yes at step S1101), when the device is identified as a branch in the protection route (Yes at step S1102), when a received PathMsg of a main route includes label limit information (Yes at step S1103), and also when there is a certain relation between the main route and the protection route (Yes at step S1104), the transmission device 1000 determines that the device is a branch, and that a handover of the label limit information to the protection route is necessary (step S1105). If any one of the above conditions is not satisfied, the transmission device 1000 determines that the device is not a branch or the handover of the label limit information to the protection route is not necessary (step S1106).

Figure 12:
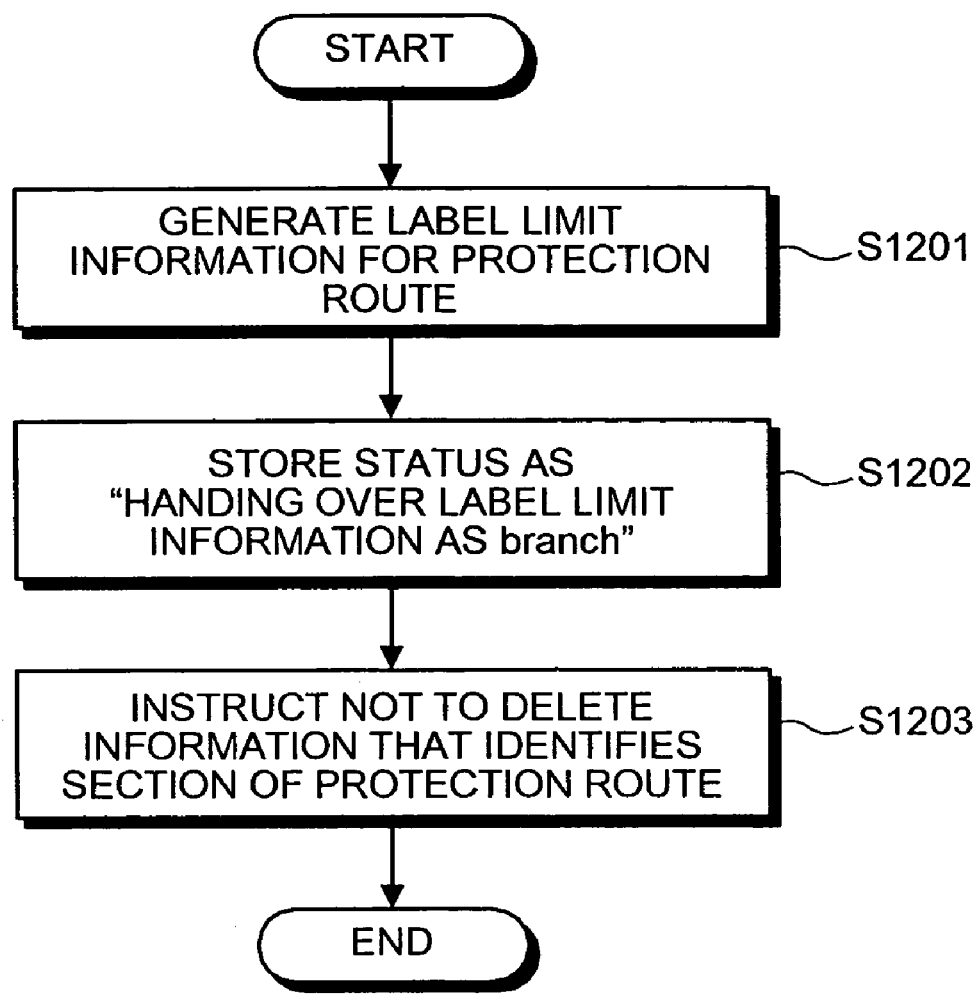
FIG. 12 is a flowchart of a process procedure of handover of label limit information to a protection route, shown in FIG. 10.

A process procedure of a handover of the label limit information to the protection route shown in FIG. 10 is explained next. FIG. 12 is a flowchart of a process procedure of the handover of the label limit information to the protection route, shown in FIG. 10. The transmission device 1000 converts the label limit information of the PathMsg for the main route into the label limit information for the protection route (step S1201). The transmission device 1000 stores into the resource database 1230 that the device is "handing over the label limit information as a branch" (step S1202). The transmission device 1000 instructs not to delete the information that identifies the section for the protection route (step S1203).

Figure 13:
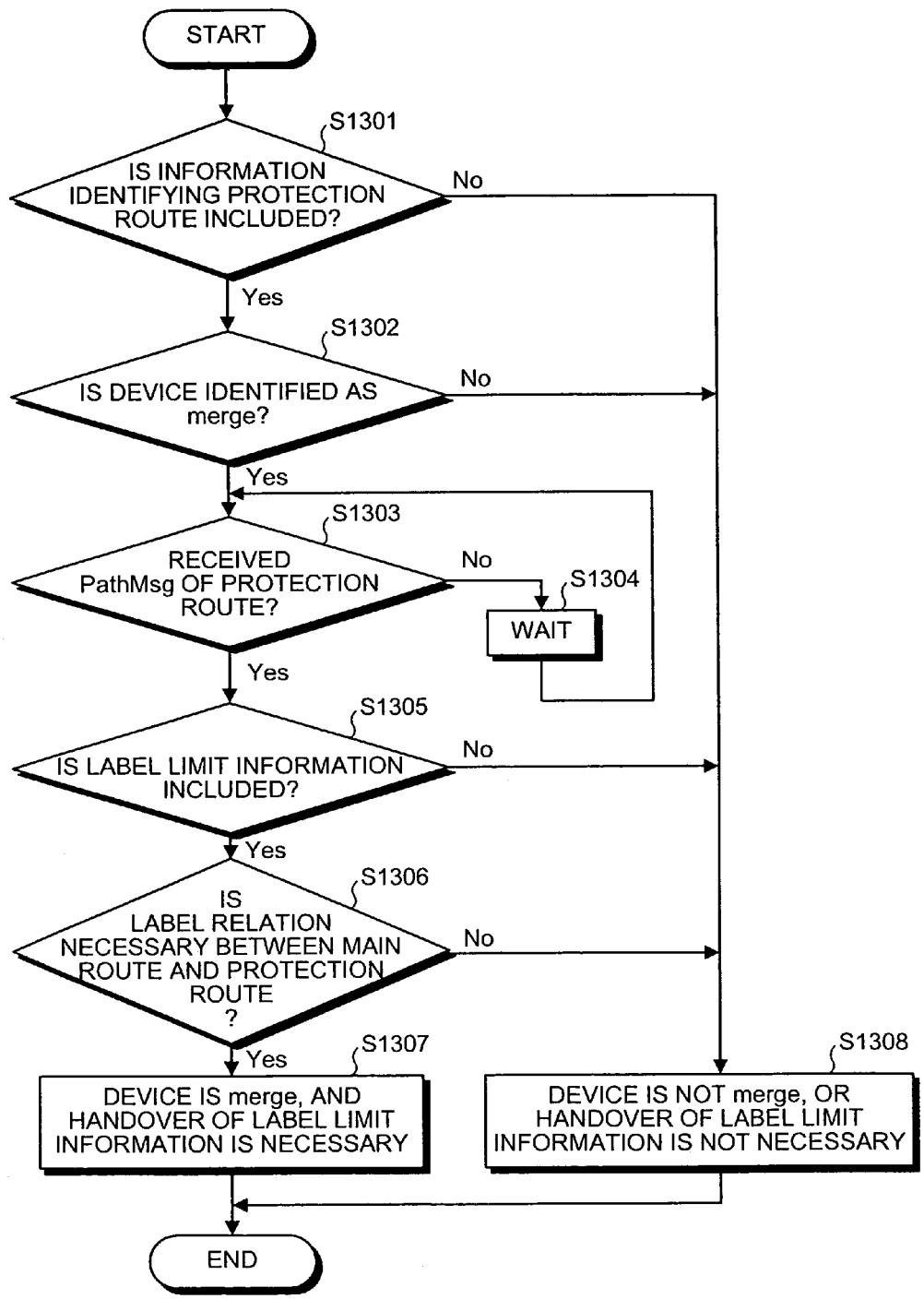
FIG. 13 is a flowchart of a process procedure of a merge determination process shown in FIG. 10.

A process procedure of a merge determination process shown in FIG. 10 is explained next. FIG. 13 is a flowchart of a process procedure of the merge determination process shown in FIG. 10. When a received PathMsg for the main route does not include information that identifies a section of a protection route (for example the SERO) (No at step S1301), or when the device is not identified as a merge in the protection route included in the PathMsg (No at step S1302), the transmission device 1000 determines that the device is not a merge (step S1308).

When the device is identified as a merge for the protection route in the received PathMsg for the main route (Yes at steps S1301 and S1302), the transmission device 1000 checks whether a PathMsg for the protection route is already received (step S1303). When a PathMsg for the protection route is not yet received (No at step S1303), the transmission device 1000 waits for the PathMsg (step S1304).

When it is confirmed that the PathMsg for the protection route is already received (Yes at step S1303), the transmission device 1000 checks whether the PathMsg for the protection route includes label limit information (step S1305). When the PathMsg for the protection route includes label limit information (Yes at step S1305), and also when a certain relation is necessary between the main route and the protection route (Yes at step S1306), the transmission device 1000 determines that the device is a merge node, and that the handover of the label limit information to the main route is necessary (step S1307).

When the PathMsg for the protection route does not include label limit information (No at step S1305) or when a certain relation is not necessary between the main route and the protection route (No at step S1306), the transmission device 1000 determines that the handover of label limit information to the main route is not necessary (step S1308).

Figure 14:
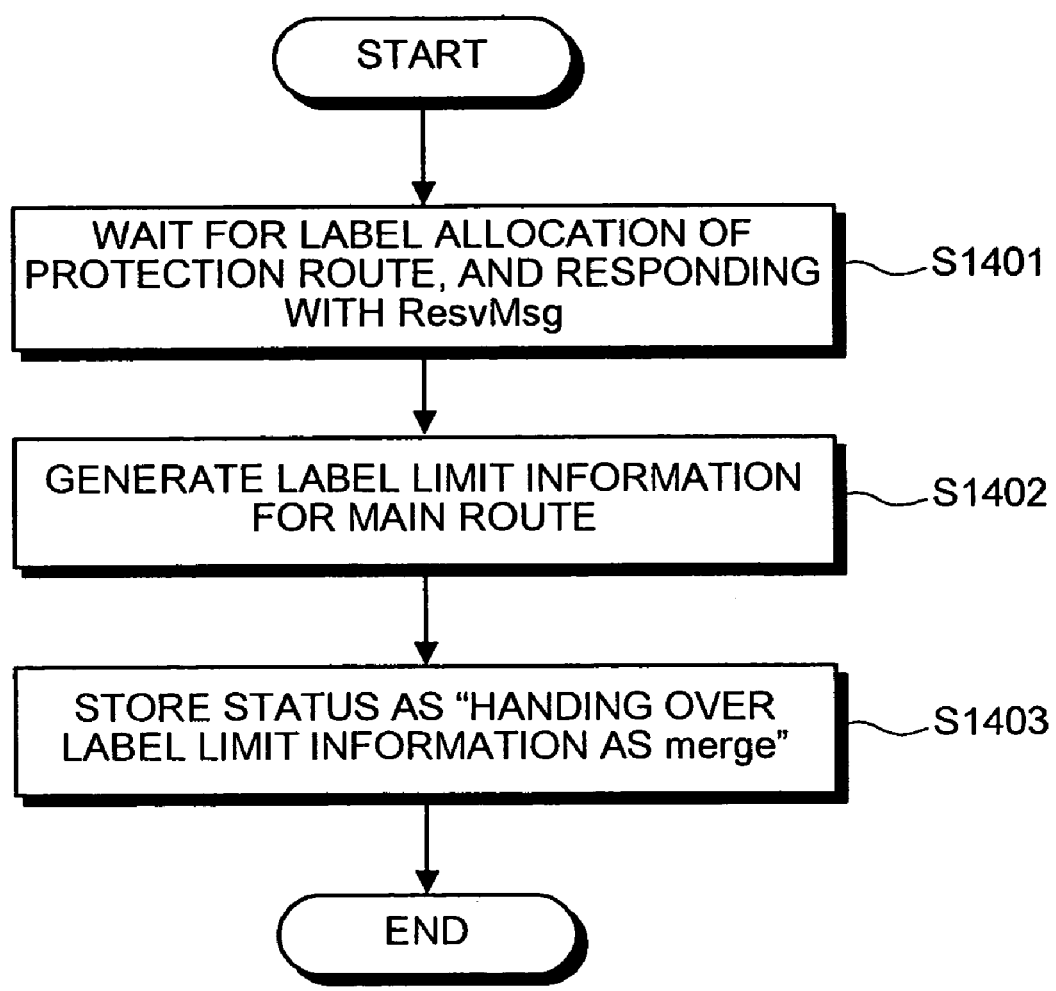
FIG. 14 is a flowchart of a process procedure of a handover of label limit information to a main route, shown in FIG. 10.

A process procedure of a handover of the label limit information to the main route, shown in FIG. 10 is explained next. FIG. 14 is a flowchart of a process procedure of the handover of the label limit information to the main route, shown in FIG. 10. The transmission device 1000 waits for allocating a label to the protection route and responding with a ResvMsg (step S1401). The transmission device 1000 converts the label limit information of the PathMsg for the protection route into the label limit information for the main route (step S1402) The transmission device 1000 stores into the resource database 1230 that the device is "handing over the label limit information as a merge" to the route (step S1403).

Figure 15:
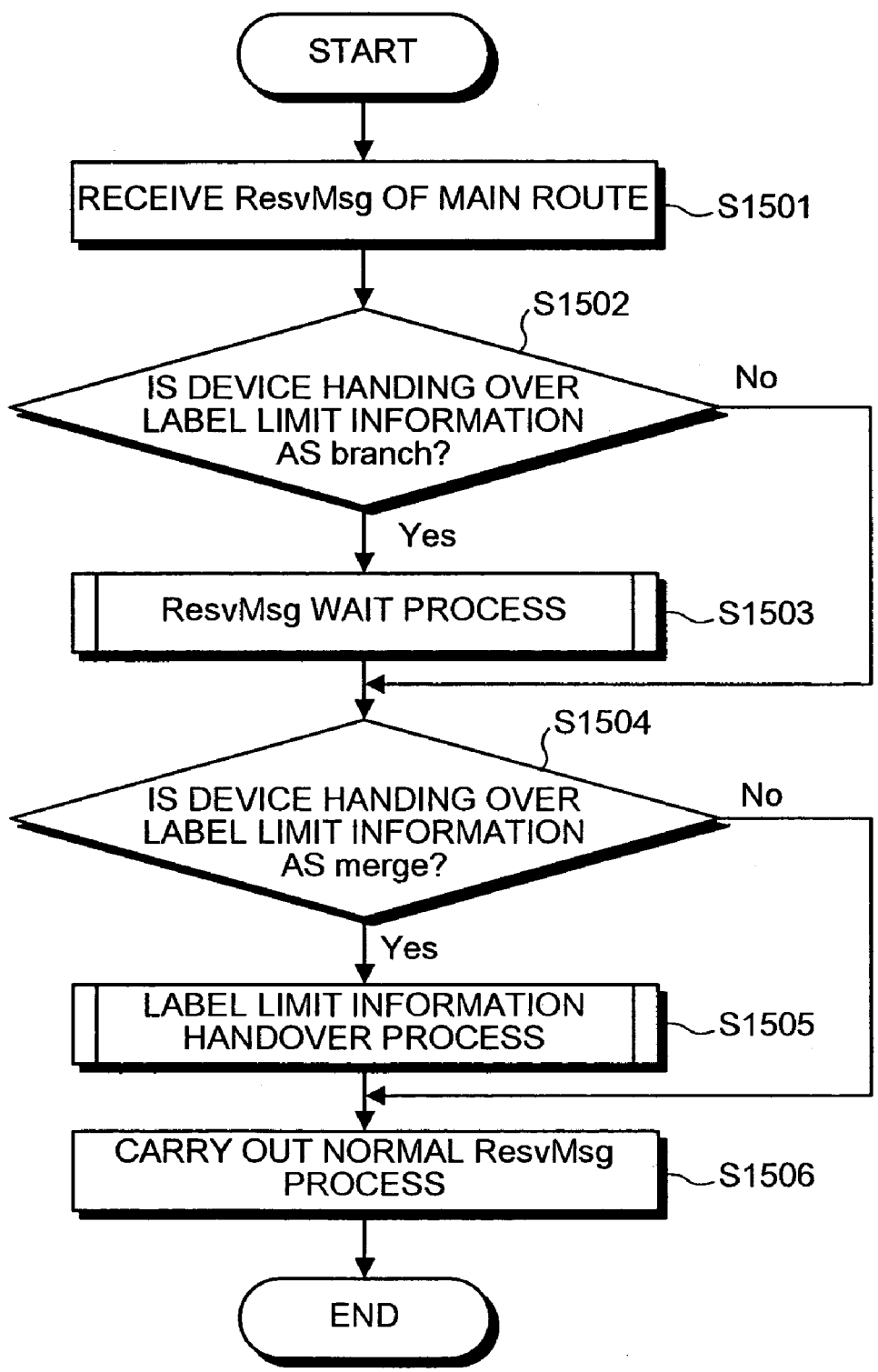
FIG. 15 is a flowchart of a process procedure when the transmission device shown in FIG. 9 receives a ResvMsg.

A process procedure when the transmission device 1000 receives a ResvMsg is explained next. FIG. 15 is a flowchart of a process procedure when the transmission device 1000 shown in FIG. 9 receives a ResvMsg. As shown in FIG. 15, the transmission device 1000 receives the ResvMsg for the main route (step S1501), and carries out the following process.

When the device is "handing over the label limit information as a branch" to the route (Yes at step S1502), the transmission device 1000 waits for a ResvMsg (step S1503). When the device is "handing over the label limit information as a merge" to the route (Yes at step S1504), the transmission device 1000 hands over the label limit information (step S1505). When the above process is completed, the transmission device 1000 carries out the normal process related to the ResvMsg (step S1506).

Figure 16:
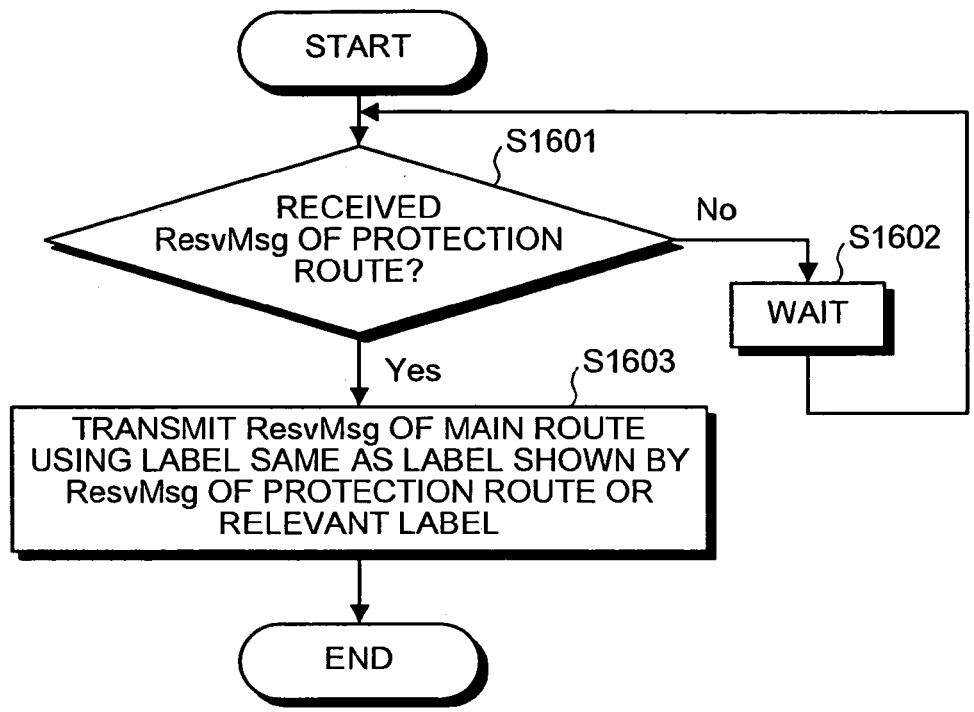
FIG. 16 is a flowchart of a process procedure of a wait process of the ResvMsg shown in FIG. 15.

A process procedure of the wait process of the ResvMsg shown in FIG. 15 is explained next. FIG. 16 is a flowchart of a process procedure of the wait process of the ResvMsg shown in FIG. 15. The transmission device 1000 checks whether the ResvMsg for the protection route is already received (step S1601). When the ResvMsg for the protection route is not yet received (No at step S1601), the transmission device 1000 waits for the ResvMsg (step S1602). When the ResvMsg for the protection route is already received (Yes at step S1601), the transmission device 1000 converts the label included in the ResvMsg for the protection route into the label for the main route, allocates the label to the path as the label for the main route, sets the label into the ResvMsg for the main route, and transmits the ResvMsg (step S1603).

Figure 17:
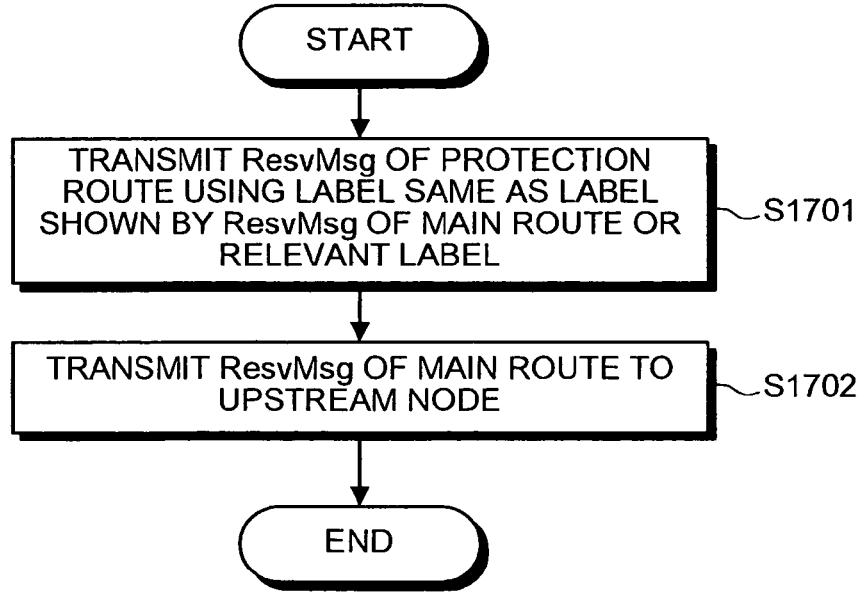
FIG. 17 is a flowchart of a process procedure of a label limit information handover process shown in FIG. 15.

A process procedure of the label limit information handover process shown in FIG. 15 is explained next. FIG. 17 is a flowchart of a process procedure of the label limit information handover process shown in FIG. 15. The transmission device 1000 converts the label included in the ResvMsg for the main route into the label for the protection route, allocates the label to the path as the label for the protection route, sets the label into the ResvMsg for the protection route, and transmits the ResvMsg (step S1701). The transmission device 1000 transmits the received ResvMsg for the main route to the upstream node for the main route (step S1702).

As described above, in the first embodiment, the device determines whether the device is a branch or a merge, based on the section information for the protection route included in a PathMsg. Therefore, the transmission device can autonomously allocate a label related to the main route and the protection route.

In the first embodiment, operation when a protection route is identified in a PathMsg is explained. In a second embodiment, operation when a protection route is not identified in a PathMsg is explained. In the present embodiment, because a protection route is not identified, a node that has a possibility of becoming a branch needs to find a protection route by itself. In other words, the node needs to find a protection route to become a branch.

Figure 18:
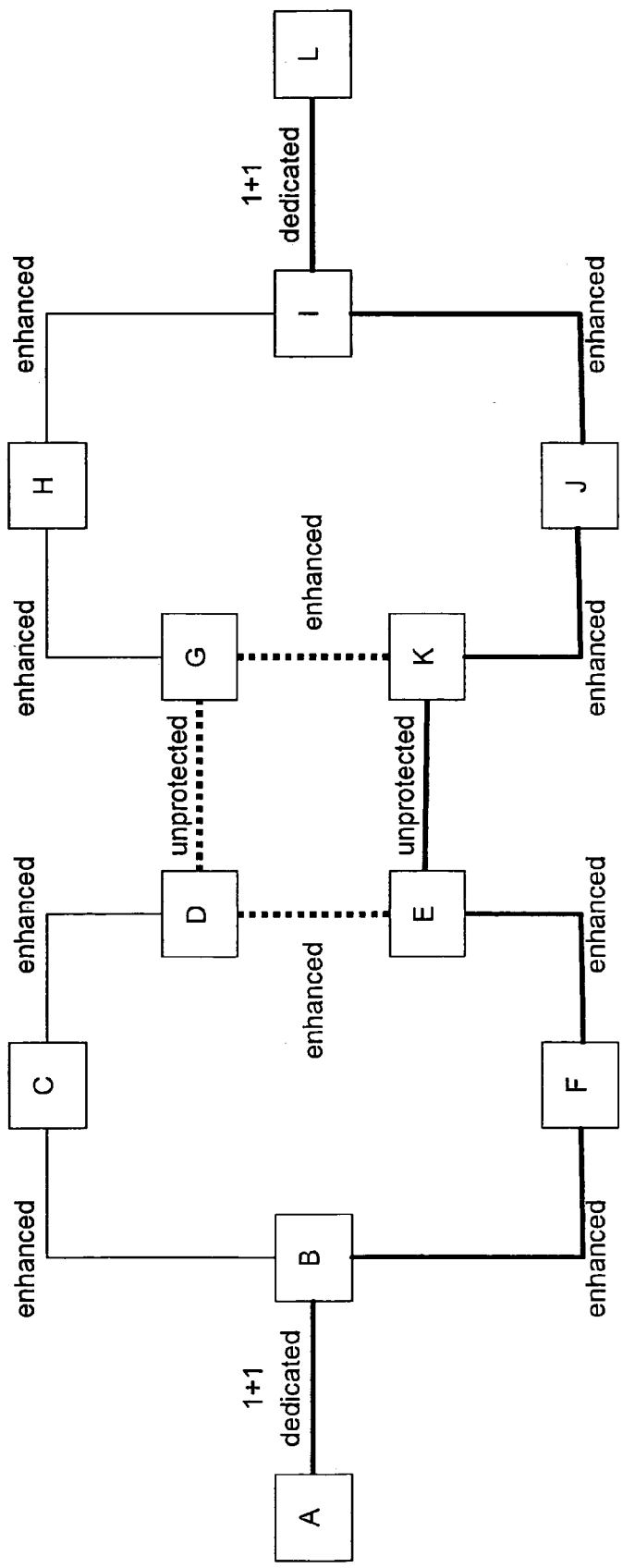
FIG. 18 is a diagram to explain link attribute information as an assumption of a second embodiment.

In order to find a protection route, link attribute information is used in the second embodiment. FIG. 18 is a diagram to explain link attribute information as an assumption of the second embodiment. The link attribute information is disclosed in a link state type routing protocol such as the OSPF-TE, and shows a protection state of each link.

According to the specification of the OSPF-TE, as shown in FIG. 18, a link of a ring part protected by BLSR is defined as "enhanced", and other links are defined as, for example, "unprotected" or as "1+1 dedicated", as a standard application. Based on this application, by referring to the link attribute information, it is possible to determine what kind of link is present in the network, and which link is a juncture between the rings.

In the example shown in FIG. 18, a link between a node E and a node K, and a link between a node D and a node G show attributes other than "enhanced", which means that these sections are junctures between the rings. By combining this information and route information included in a PathMsg, it is possible to determine whether the device is a branch and find a protection route.

Assume that a PathMsg issued from a node A is set with information indicating that a route for the main route is a connection of the nodes A, B, F, E, K, J, I, and L. From the link attribute information, it is clear that the section between the node E and the node K is a juncture between the rings, and that the node E at the ingress side has a possibility of becoming a branch.

In order for the node E to become a branch, a protection route must be found. A protection route requires that the device be a starting point, that any one node of a main route present in the next ring connected to the device be a destination, and that this route be shortest having no section overlapping the main route. From the link attribute information, it is also clear that the link between the node D and the node G is a juncture between the rings. Based on these pieces of information, it becomes clear that a route connecting the nodes E, D, G, and K becomes a protection route.

Accordingly, the node E can recognize that the device is a branch, and that the route connecting the nodes E, D, G, and K must be set as a protection route. Having recognized that the device is a branch, the node E sets a bit indicating that a segment protection is being implemented to the PathMsg for the main route, in order to prevent the downstream node from erroneously recognizing that the device is a branch. This bit is cleared in the downstream merge. The bit indicating that a segment protection is being implemented can be set by using an InPlace-bit of the protection object defined in the Reference 2.

In order to properly allocate a label to the protection route detected by the node E, the node K needs to behave as a merge. However, because the node K does not know that it has become a merge, the node E needs to somehow notify the node K about it. The node E sets a label limit handover request flag to the PathMsg for the main route, thereby notifying the node K that it is a merge.

A node that receives a PathMsg set with a label limit handover request flag determines whether it is an ADD node. If the device is an ADD node, the node recognizes that the device is a merge, and behaves as a merge. The label limit handover request flag can be set using any one bit of a field that is not currently being used in the protection object, for example.

However, depending on a route setting, the setting of a label limit handover request flag is not necessary. For example, to set a route as shown in FIG. 3A, a wait process as a merge is not necessary, and therefore, the setting of a label limit handover request flag is not necessary. A node that has become a branch sets a label limit handover request flag, only if the attribute of the last link for the protection route found expresses a ring (for example, "enhanced").

A configuration of the transmission device that constitutes a network in the second embodiment is the same as that according to the first embodiment, and therefore, explanation thereof is omitted. A basic process procedure of the transmission device is also the same as that shown in FIG. 10 and FIG. 15. Therefore, only that part of the process procedure which differs, is explained here.

Figure 19:
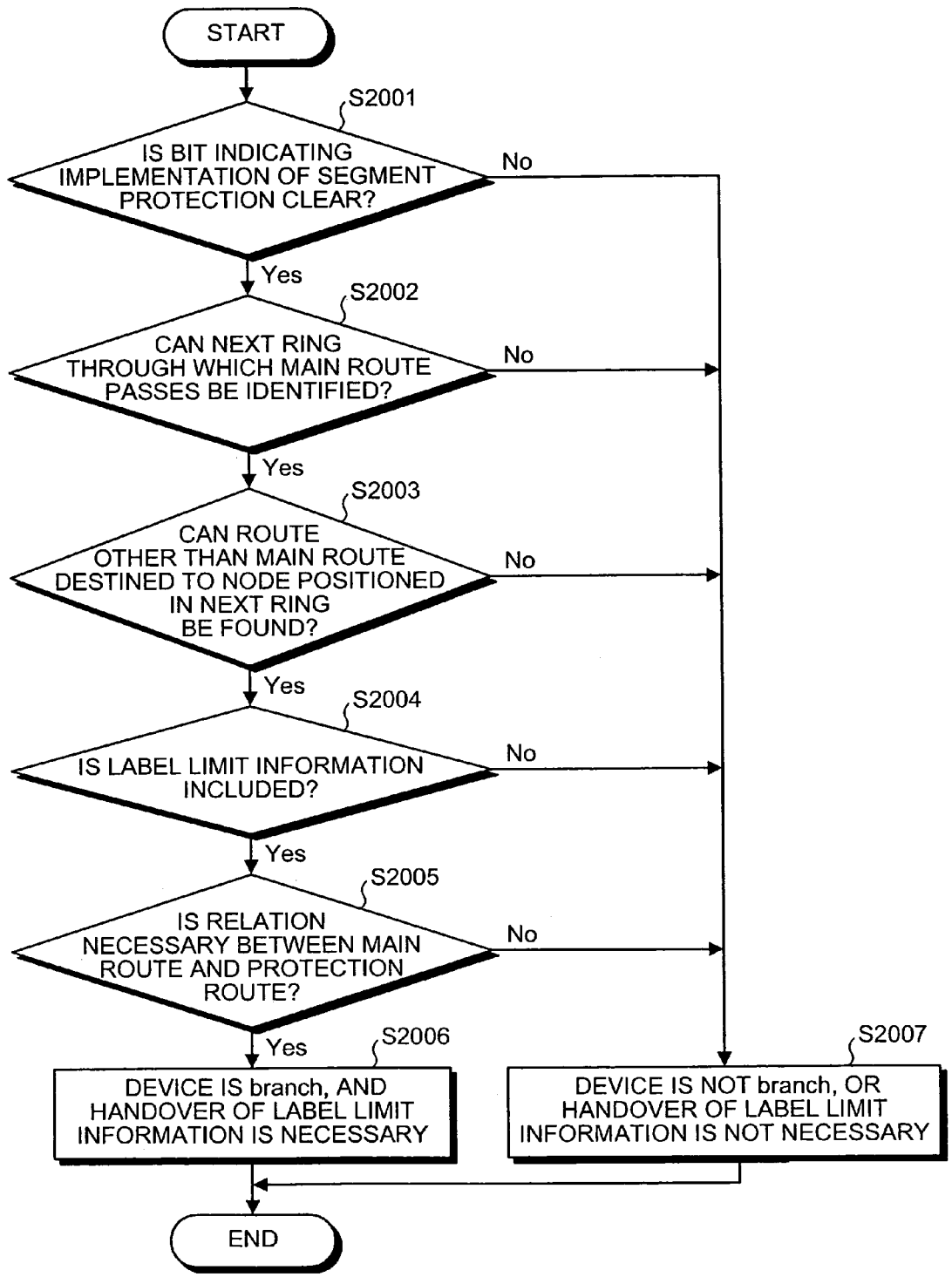
FIG. 19 is a flowchart of a process procedure of a branch determination process according to the second embodiment.

A process procedure of the branch determination process is explained first. FIG. 19 is a flowchart of a process procedure of the branch determination process according to the second embodiment. When a bit indicating that a segment protection of a PathMsg is being implemented is clear (Yes at step S2001), when the presence of the next link can be identified from the link attribute information or the like (Yes at step S2002), when the device is a starting point, when a shortest route other than the main route that is connected to a node positioned in the next ring can be found (Yes at step S2003), when a PathMsg includes label limit information (Yes at step S2004), and when a certain relation is necessary between the main route and the protection route (Yes at step S2005), the transmission device determines that it is a branch, and that a handover of label limit information to the protection route is necessary (step S2006). If any one of the above conditions is not satisfied, the transmission device determines that it is not a branch, or a handover of label limit information to the protection route is not necessary (step S2007).

Figure 20:
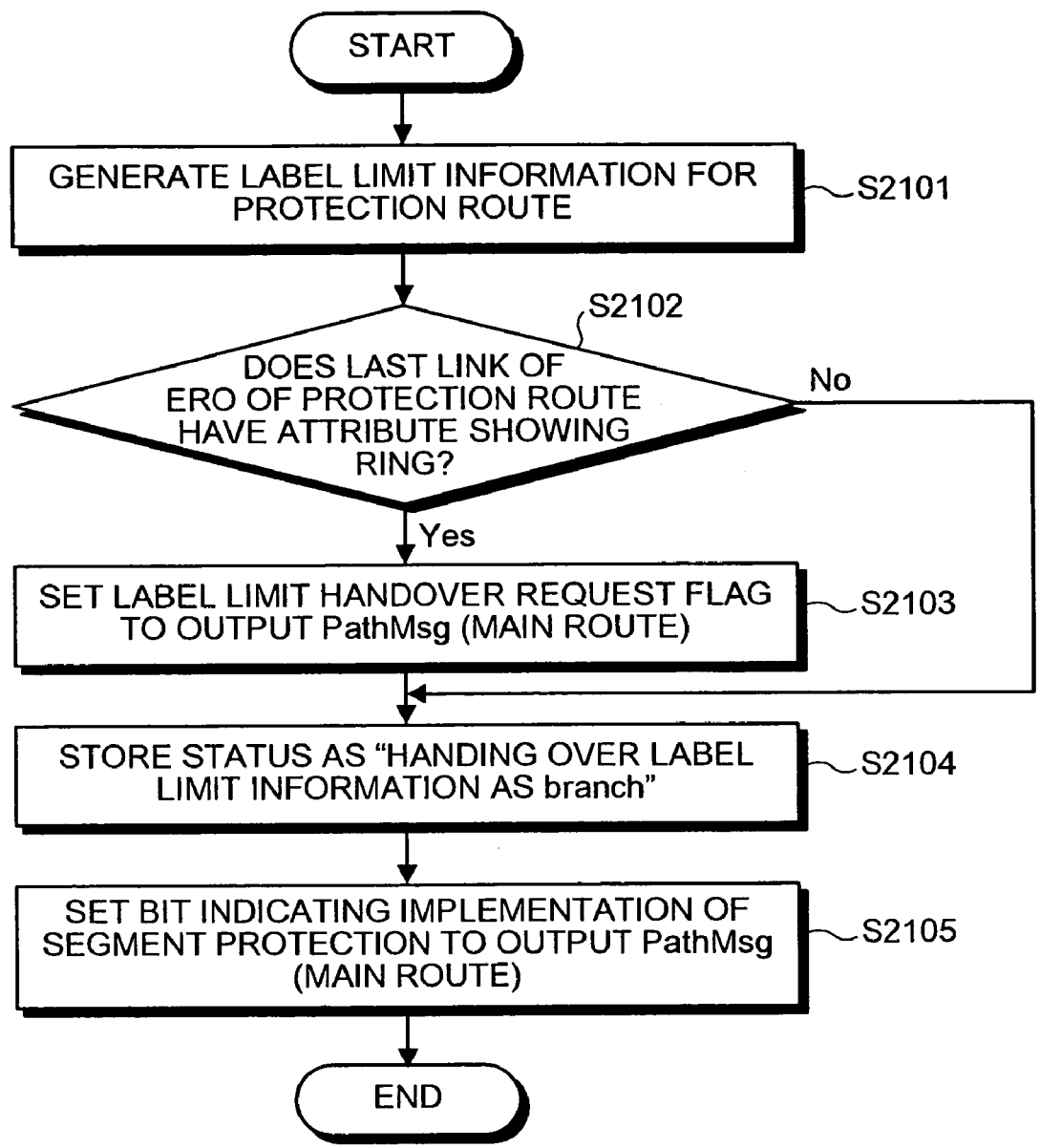
FIG. 20 is a flowchart of a process procedure of the handover of the label limit information to the protection route according to the second embodiment.

A process procedure of a handover of label limit information to a protection route is explained next. FIG. 20 is a flowchart of a process procedure of the handover of the label limit information to a protection route according to the second embodiment. Label limit information of a PathMsg of a main route is converted into label limit information for a protection route (step S2101). If the last link for the protection route has a ring attribute (Yes at step S2102), a label limit handover request flag is set to the PathMsg for the main route (step S2103).

The status that the device is "handing over label limit information as a branch" regarding the route is stored, for example, into the resource database 1230 (step S2104). A bit indicating that a segment protection is being implemented is set to the output PathMsg for the main route (step S2105).

To generate label limit information for a protection route at step S2101, instead of converting the label limit information for the main route, the information can be narrowed down to obtain label limit information for the protection route. When the label limit information for the main route is converted into the label limit information for the protection route, the protection route is present in the ring at the branch side as shown in FIG. 2A and FIG. 3A. On the other hand, when the label limit information for the main route is used as the label limit information for the protection route without a conversion, the protection route is not present in the ring at the branch side as shown in FIG. 4A.

Which system is to be used can be determined based on, for example, priority information included in the PathMsg. A generator (the ingress) of the PathMsg can indicate the priority information using, for example, a setup priority field or a holding priority field within the session attribute object, or a secondary-bit of the protection object. Alternatively, either of the systems can be always used. When an attempt to establish a path using either of the systems is unsuccessful, other system can be used.

Figure 21:
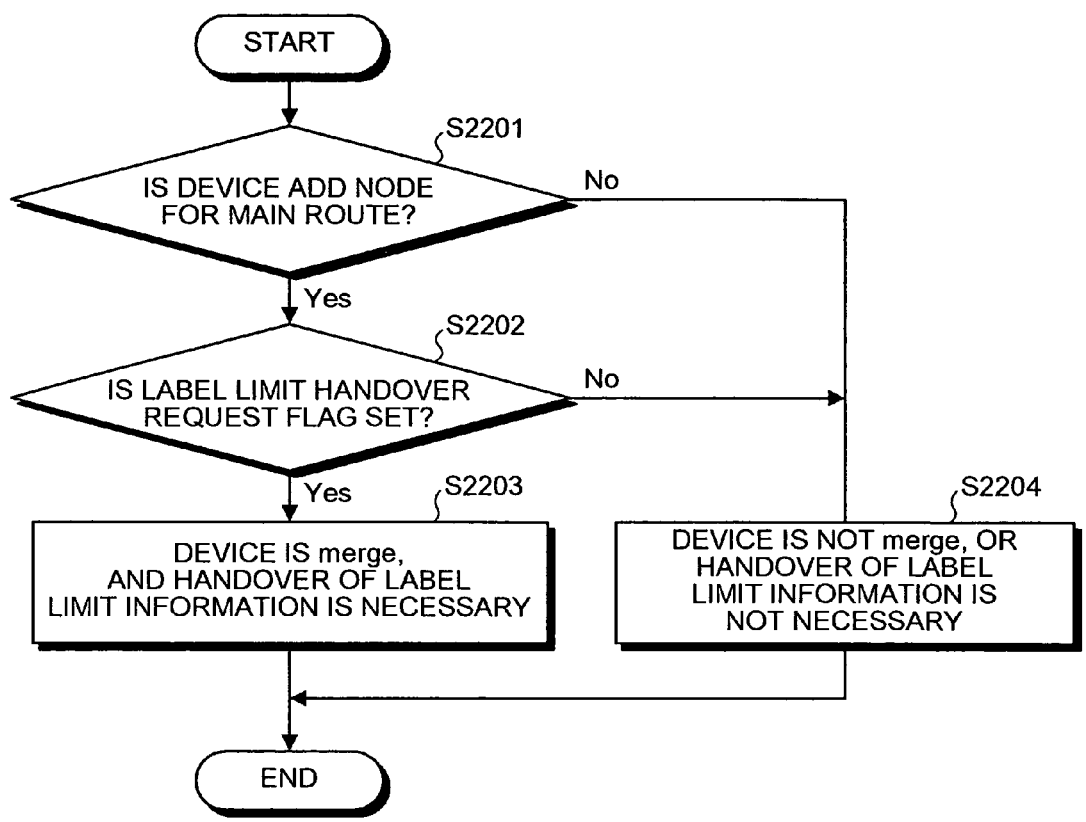
FIG. 21 is a flowchart of a process procedure of the merge determination process according to the second embodiment.

A process procedure of the merge determination process is explained next. FIG. 21 is a flowchart of a process procedure of the merge determination process according to the second embodiment. When the device is an ADD node for a main route (Yes at step S2201), and when a label limit handover request flag is set to a PathMsg (Yes at step S2202), the transmission device determines that it is a merge node, and that a handover of label limit information to the main route is necessary (step S2203). If any of the above conditions is not satisfied, the transmission device determines that it is not a merge node, or the handover of the label limit information to the main route is not necessary (step S2204).

Figure 22:
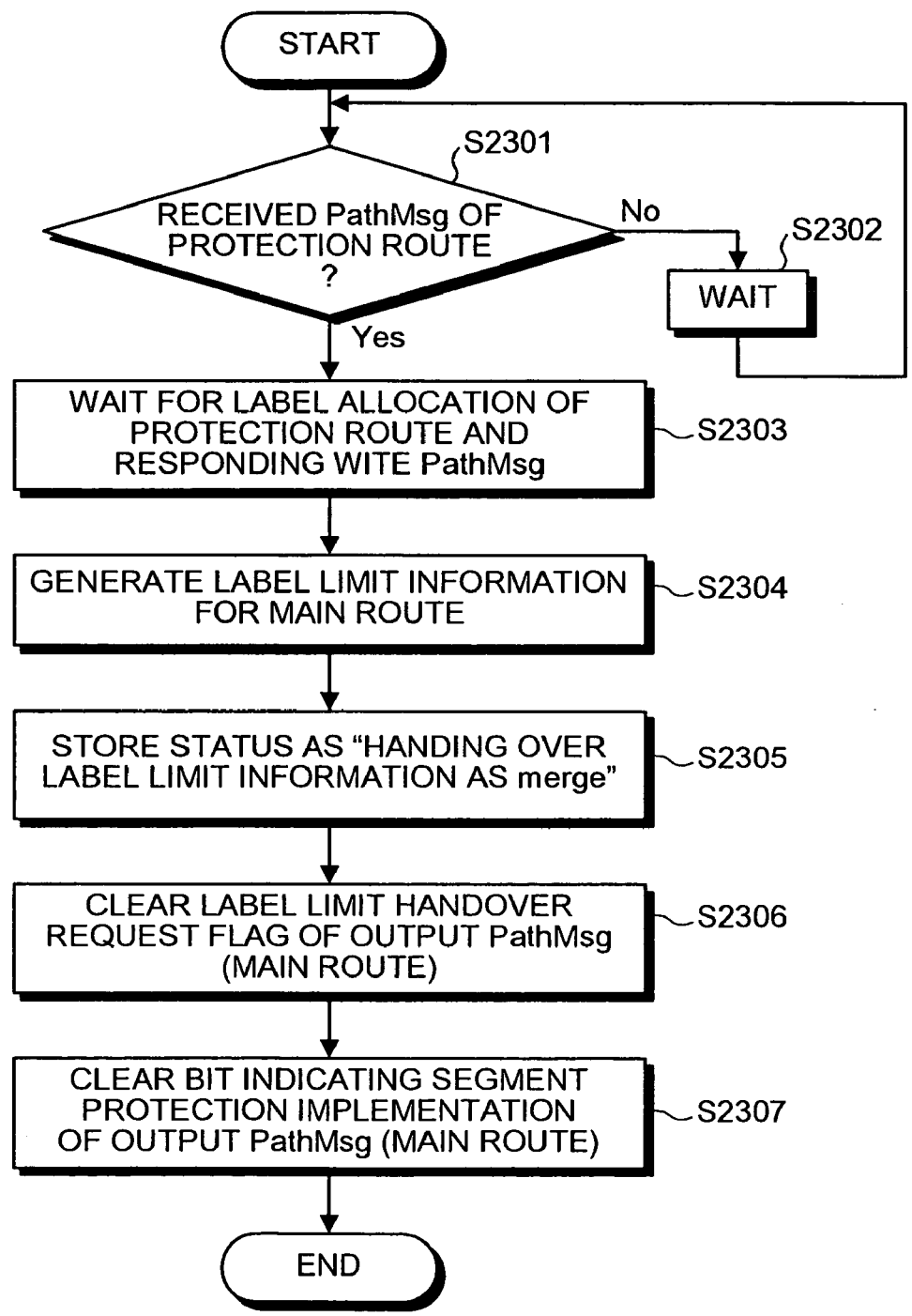
FIG. 22 is a flowchart of a process procedure of the handover of the label limit information to the main route according to the second embodiment.

A process procedure of a handover of the label limit information to the main route is explained next. FIG. 22 is a flowchart of a process procedure of the handover of the label limit information to the main route according to the second embodiment. The transmission device checks whether a PathMsg for the protection route is received (step S2301). When a PathMsg for the protection route is not received (No at step S2301), the transmission device waits for the PathMsg (step S2302). When a PathMsg for the protection route is received (Yes at step S2301), the transmission device waits for taking action to allocate a label for the protection route and responding with a ResvMsg (step S2303).

The transmission device converts the label limit information of the PathMsg for the protection route into the label limit information for the main route (step S2304), and stores into, for example, the resource database 1230 that the device is "handing over the label limit information as a merge" to the route (step S2305). The transmission device clears the label limit handover request flag from the PathMsg for the main route (step S2306), and clears a bit indicating that the segment protection is being implemented (step S2307).

The above label allocation system cannot be applied to a network of a configuration in which a node strides over two rings as shown in FIG. 5A, FIG. 6A, and FIG. 7A. This is because in the network of this configuration, link attribute information at a link juncture is not present, and the next link section cannot be found by referring to link attribute information. Therefore, a node that must not become a branch cannot determine that it is not a branch.

In order to solve this problem, the device setting information database 1210 can be set with information indicating whether the device is in a ring double attribute configuration. The ring double attribute configuration means that double links are set to another ring. The device is in a ring double attribute configuration means that the device is connected to one end of these links. By referring to this setting, a node that must not become a branch can determine that it is not a branch.

Figure 23:
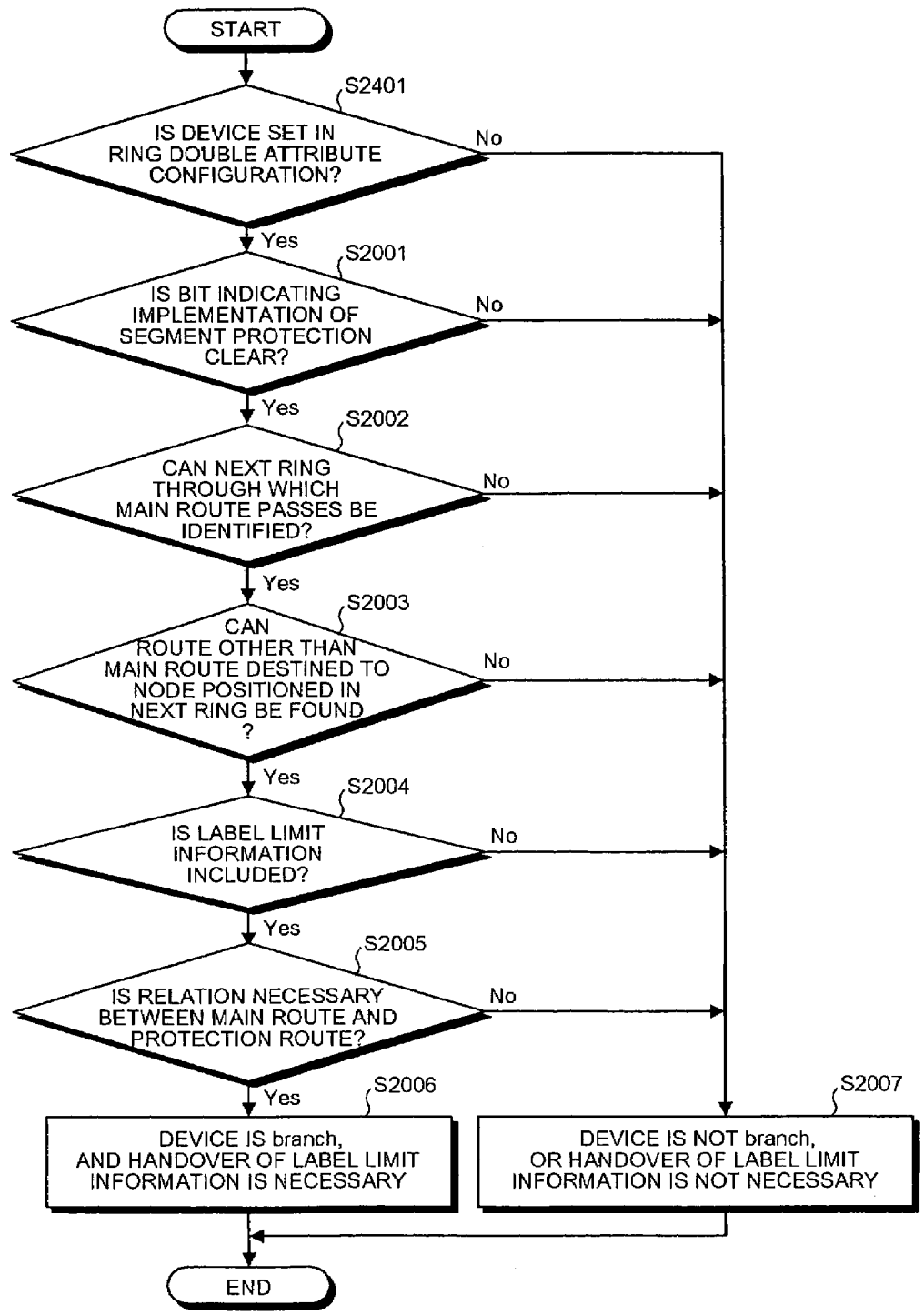
FIG. 23 is a flowchart of a process procedure of a branch determination process when there is a setting to determine whether a device is in a ring double attribute configuration, according to the second embodiment.

FIG. 23 is a flowchart of a process procedure of a branch determination process when there is a setting to determine whether a device is in a ring double attribute configuration. The process procedure shown in FIG. 23 is the same as that shown in FIG. 19, except that whether a device is in a ring double attribute configuration is checked at the start of the process, and when there is no setting that the device is in the ring double attribute configuration (No at step S2401), the transmission device determines that it is not a branch.

Figure 24:
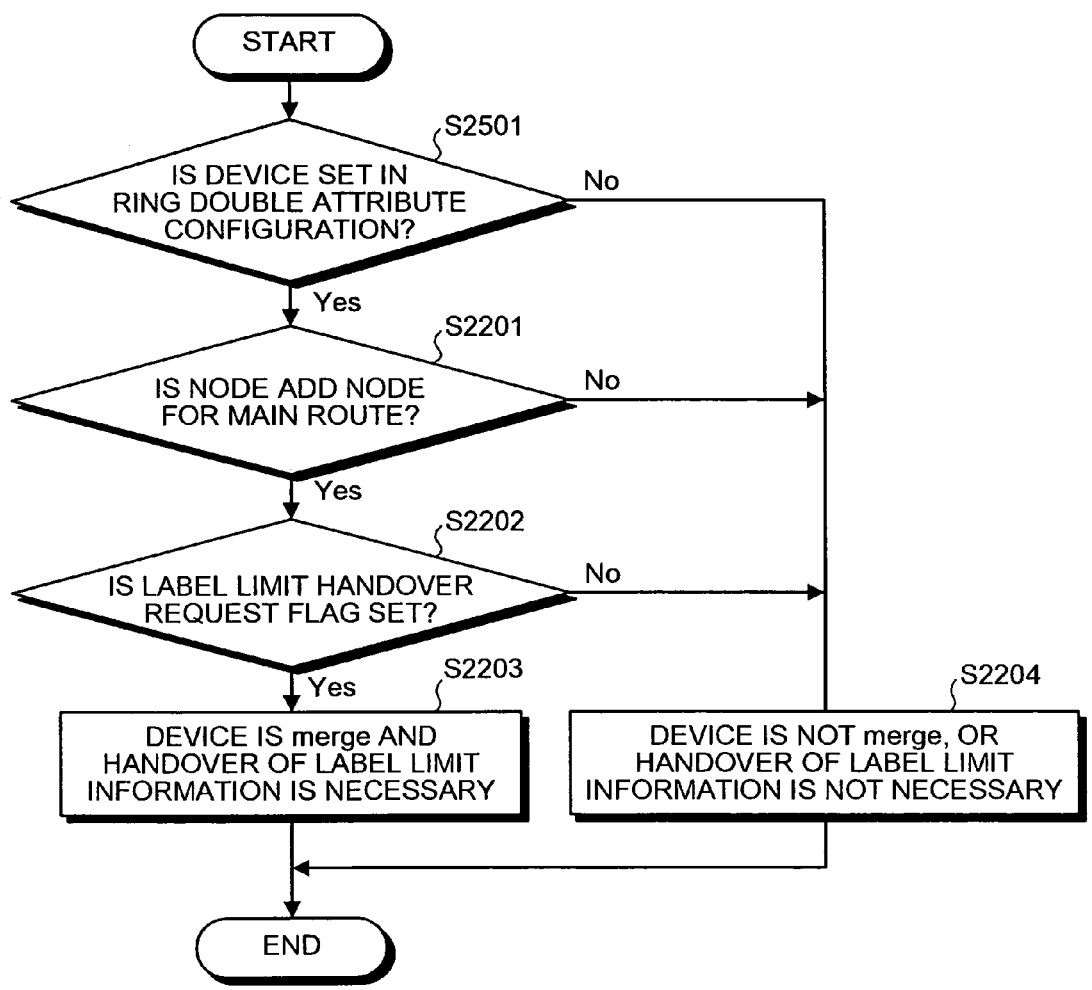
FIG. 24 is a flowchart of a process procedure of a merge determination process when there is a setting to determine whether a device is in a ring double attribute configuration, according to the second embodiment.

FIG. 24 is a flowchart of a process procedure of a merge determination process when there is a setting to determine whether a device is in a ring double attribute configuration. The process procedure shown in FIG. 24 is the same as that shown in FIG. 21, except that whether a device is in a ring double attribute configuration is checked at the start of the process, and when there is no setting that the device is in the ring double attribute configuration (No at step S2501), the transmission device determines that it is not a merge.

As explained above, when there is a setting to determine whether a device is in a ring double attribute configuration, and when this setting is checked at the start of the process, an unnecessary process in the node that has no possibility of becoming a branch or a merge can be avoided.

However, even when there is a setting to determine whether the node is in a ring double attribute configuration, a route setting as shown in FIG. 7A cannot be achieved. In FIG. 7A, the node B cannot understand that the device is not a DROP node for a main route, and cannot recognize the presence of a juncture between the rings based on the link attribute information disclosed. Therefore, the node B cannot recognize the presence of a node of the next ring in the main route set in the PathMsg.

Figure 25:
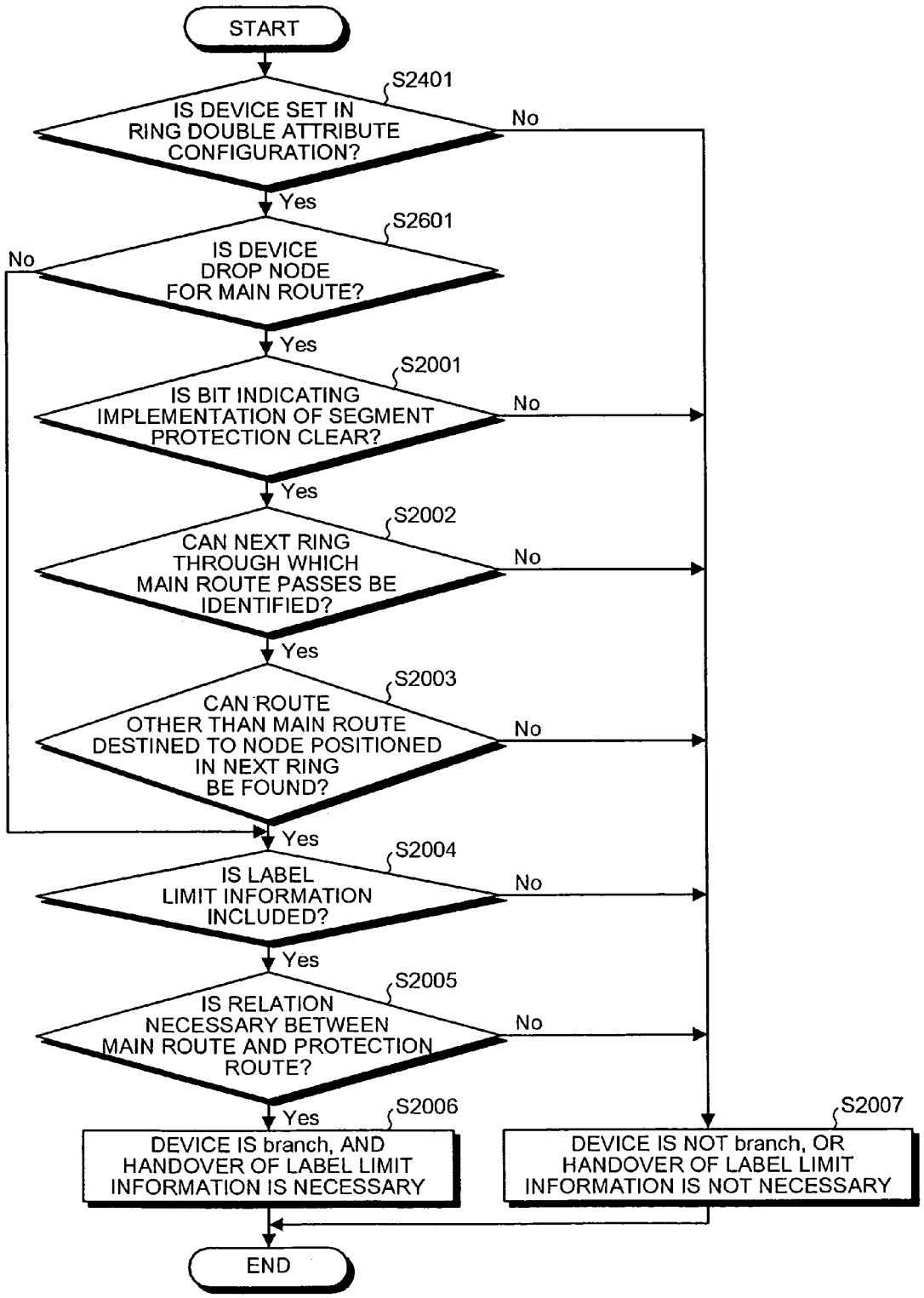
FIG. 25 is a revised flowchart of the process procedure of the branch determination process when there is a setting to determine whether a device is in the ring double attribute configuration, according to the second embodiment.

FIG. 25 is a revised flowchart of a process procedure of the branch determination process when there is a setting to determine whether a device is a ring double attribute configuration. According to the process procedure shown in FIG. 25, when the device is not a DROP node for a main route (No at step S2601), the identification of the next ring is not carried out, thereby solving the above problem.

As explained above, in the second embodiment, the transmission device determines whether it is a branch or a merge, based on the link attribute information disclosed by the routing protocol. Therefore, the transmission device can autonomously allocate a label related to the main route and the protection route.

In the second embodiment, the system of determining whether the device is a branch or a merge by using the link attribute information disclosed by the routing protocol, and the system of determining whether the device is a branch or a merge by using a setting to determine whether the device is in a ring double attribute configuration, are explained.

In the system of determining whether the device is a branch or a merge by using a setting to determine whether the device is in a ring double attribute configuration, the process can be simplified by further modification. As a third embodiment, pair device information is set to a node that is in a ring double attribute configuration. The pair device information is identification information of the other node that is connected to the same ring. The identification information can be an Internet Protocol (IP) address that can uniquely identify a node.

Figure 26:
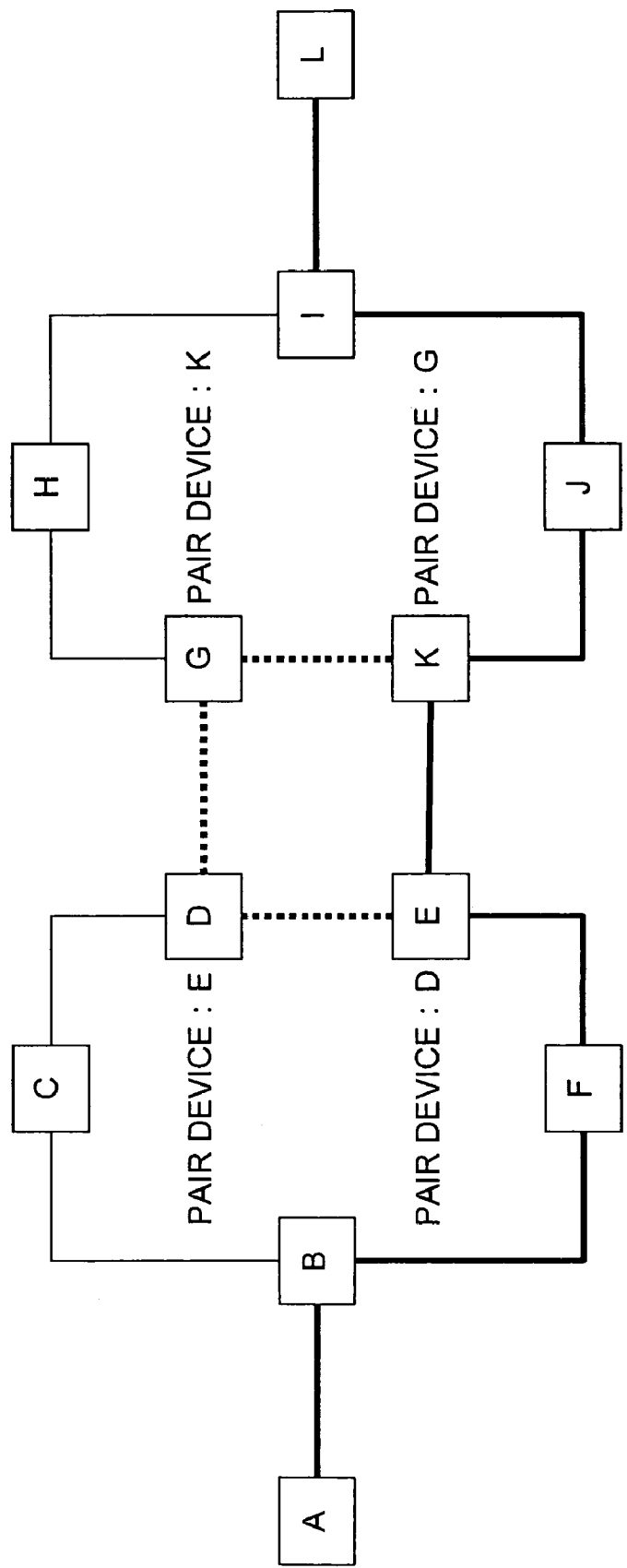
FIG. 26 is a diagram to explain pair device setting information as an assumption of a third embodiment.

FIG. 26 is a diagram to explain pair device setting information as an assumption of the third embodiment. As shown in FIG. 26, in the present embodiment, pair device information is set to the nodes at a juncture between the rings. By setting the pair device information, a label limit handover request flag required in the second embodiment is not necessary in the third embodiment.

At the time of receiving a PathMsg of a main route, when a bit indicating that the segment protection is being implemented is set to this PathMsg, and also when the device is an ADD node to the front ring for the main route, the device or the node that is set in the pair device information must become a merge. When a node set in the pair device information is present at the downstream for the main route, it is determined that this node is a merge. Otherwise, it is determined that the device is a merge.

A configuration of the transmission device that constitutes a network according to the present embodiment is the same as that according to the first embodiment, and therefore, explanation thereof is omitted. A basic process procedure of the transmission device is also the same as that shown in FIG. 10 and FIG. 15. Therefore, only a part of the process procedure which differs, is explained here.

Figure 27:
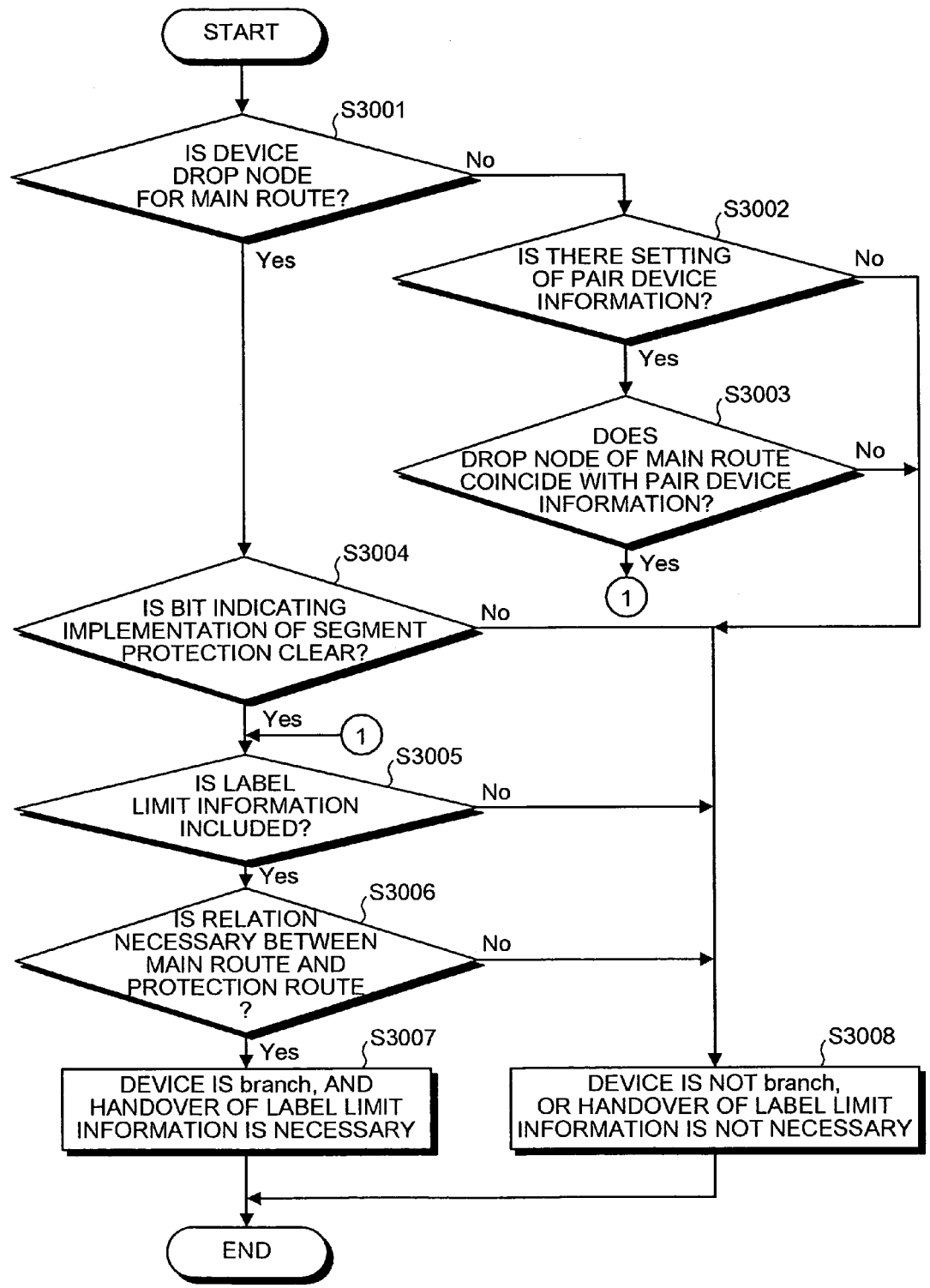
FIG. 27 is a flowchart of a process procedure of the branch determination process according to the third embodiment.

A process procedure of the branch determination process is explained first. FIG. 27 is a flowchart of a process procedure of the branch determination process according to the third embodiment. When the device is a DROP node for the main route (Yes at step S3001), and when a bit indicating that a segment protection of a PathMsg is being implemented is not clear (No at step S3004), the transmission device determines that it is not a branch or a handover of label limit information to the protection route is not necessary (step S3008).

When the device is not a DROP node for the main route (No at step S3001), when pair device information is not set to the device (No at step S3002), and when the DROP node for the main route does not coincide with the pair device information (No at step S3003), the transmission device determines that it is not a branch or determines that the handover of the label limit information to the protection route is not necessary (step S3008).

In other cases, when a PathMsg includes label limit information (Yes at step S3005), and when a certain relation is necessary between the main route and the protection route (Yes at step S3006), the transmission device determines that it is a branch and that the handover of the label limit information to the protection route is necessary (step S3007). When these two conditions are not satisfied, the transmission device determines that it is not a branch or that the handover of the label limit information to the protection route is not necessary (step S3008).

Figure 28:
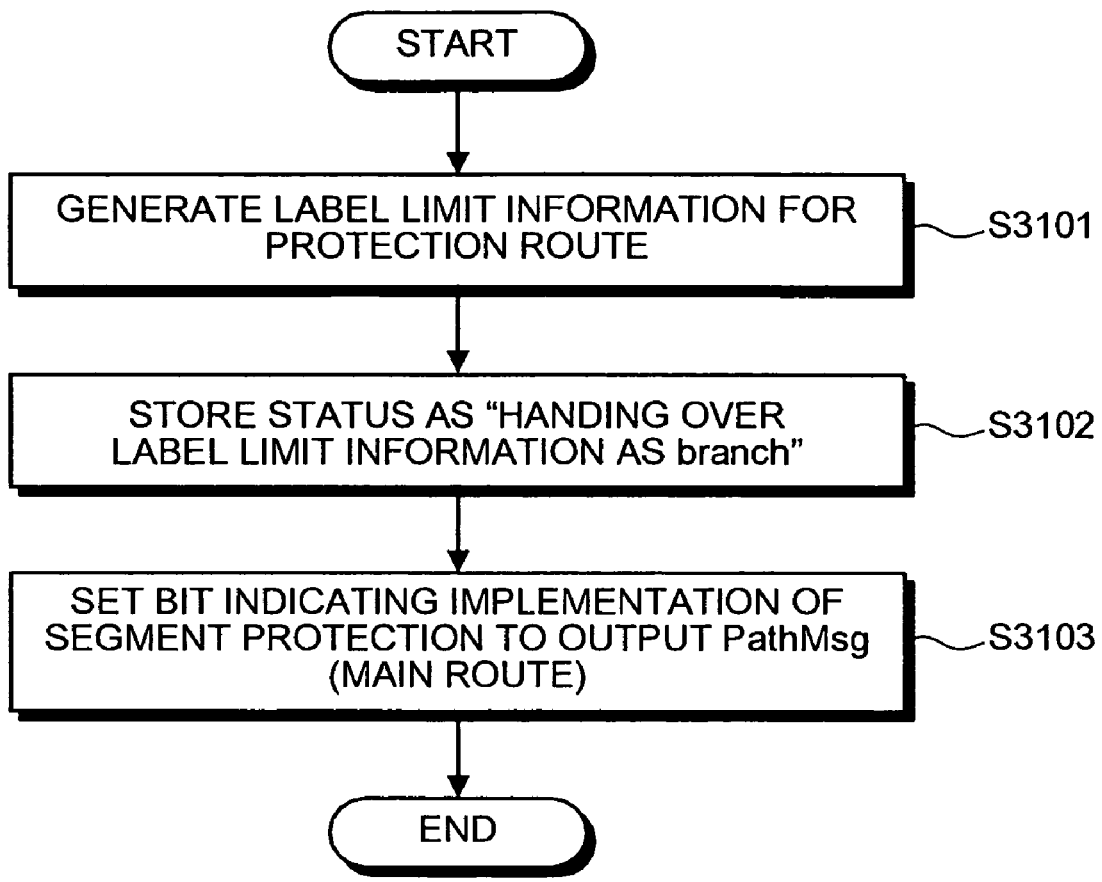
FIG. 28 is a flowchart of a process procedure of the handover of the label limit information to the protection route according to the third embodiment.

A process procedure of a handover of label limit information to a protection route is explained next. FIG. 28 is a flowchart of the process procedure of the handover of the label limit information to a protection route according to the third embodiment. Label limit information of a PathMsg of a main route is converted into label limit information for a protection route (step S3101). The transmission device stores, for example, into the resource database 1230, information that the device is "handing over the label limit information as a branch" to the route (step S3102). The transmission device sets a bit indicating that a segment protection is being implemented to the PathMsg for the main route (step S3103).

Figure 29:
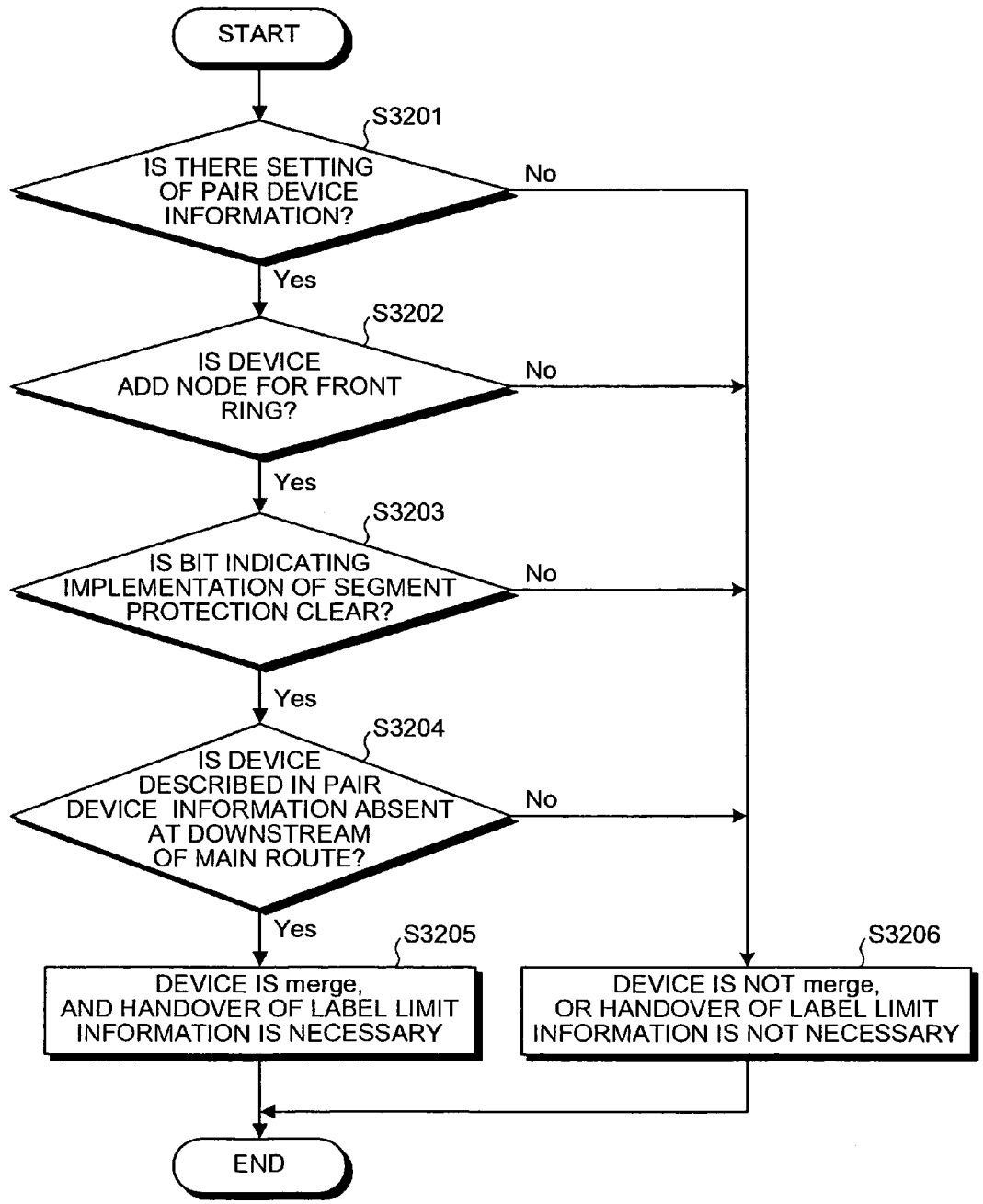
FIG. 29 is a flowchart of a process procedure of the merge determination process according to the third embodiment.

A process procedure of a merge determination process is explained next. FIG. 29 is a flowchart of a process procedure of the merge determination process according to the third embodiment. When pair device information is set in the device (Yes at step S3201), when the device is an ADD node to the front ring for the main route (Yes at step S3202), when a bit indicating that the segment protection is being implemented is set to this PathMsg (Yes at step S3203), and when a device described in the pair device information is not present at the downstream for the main route (Yes at step S3204), the transmission device determines that it is a merge and that the handover of the label limit information to the main route is necessary (step S3205). When any one of the above conditions is not satisfied, the transmission device determines that it is not a merge or the handover of the label limit information to the main route is not necessary (step S3206).

Figure 30:
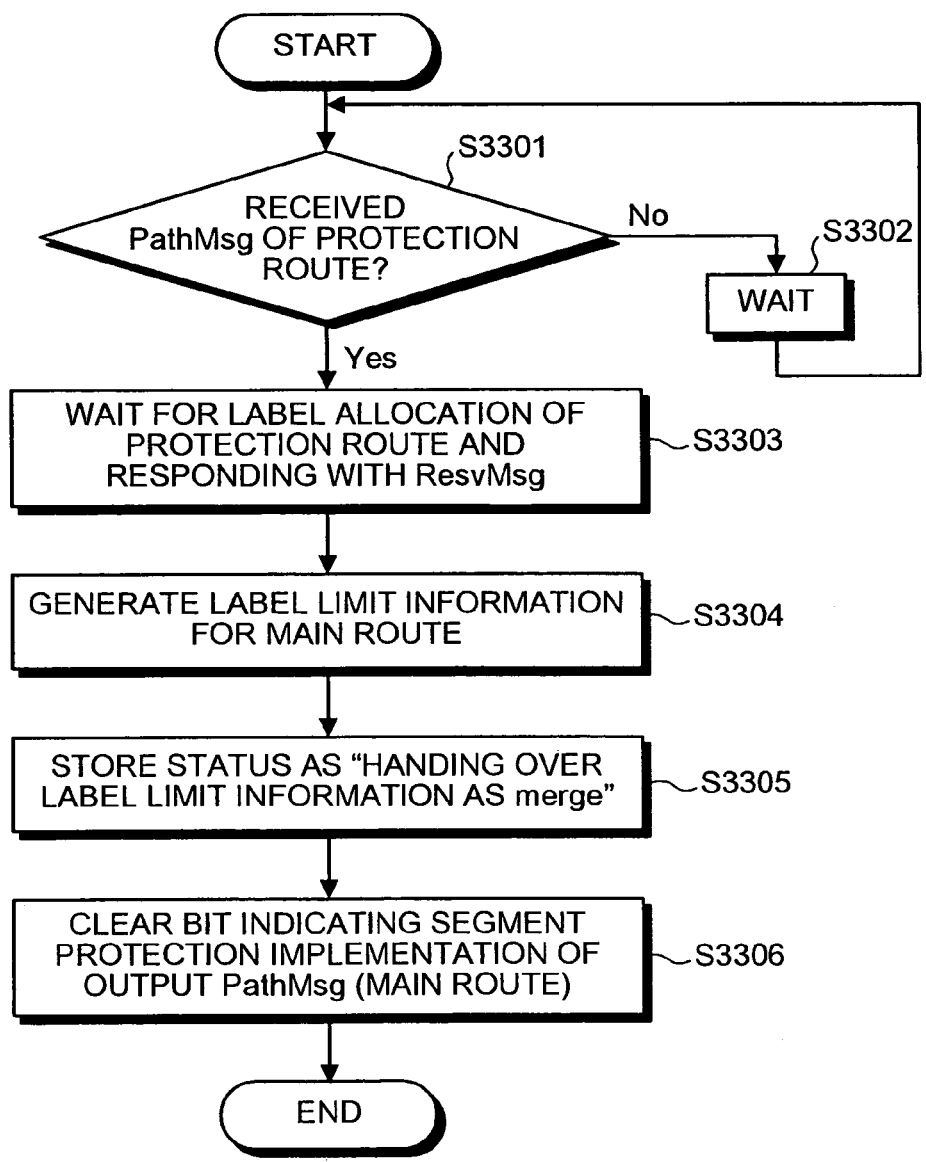
FIG. 30 is a flowchart of a process procedure of the handover of the label limit information to the main route according to the third embodiment.

A process procedure of a handover of label limit information to a main route is explained next. FIG. 30 is a flowchart of a process procedure of the handover of the label limit information to a main route according to the third embodiment. The transmission device checks whether the PathMsg for the protection route is already received (step S3301). When the PathMsg for the protection route is not yet received (No at step S3301), the transmission device waits for the PathMsg (step S3302). When the PathMsg for the protection route is received (Yes at step S3301), the transmission device waits for taking action to allocate the label to the protection route and responding with a ResvMsg (step S3303).

The transmission device converts the label limit information of the PathMsg for the protection route into the label limit information for the main route (step S3304), and stores into, for example, the resource database 1230 that the device is "handing over the label limit information as a merge" to the route (step S3305). The transmission device clears a bit that indicates that the segment protection is being implemented (step S3306).

In the present embodiment, the route setting as shown in FIG. 7A cannot be achieved. In FIG. 7A, the node B cannot understand that it is not a DROP node for a main route, and cannot recognize the presence of a juncture between the rings based on the disclosed link attribute information. Therefore, the node B cannot recognize which node is the DROP node in the main route.

Figure 31:
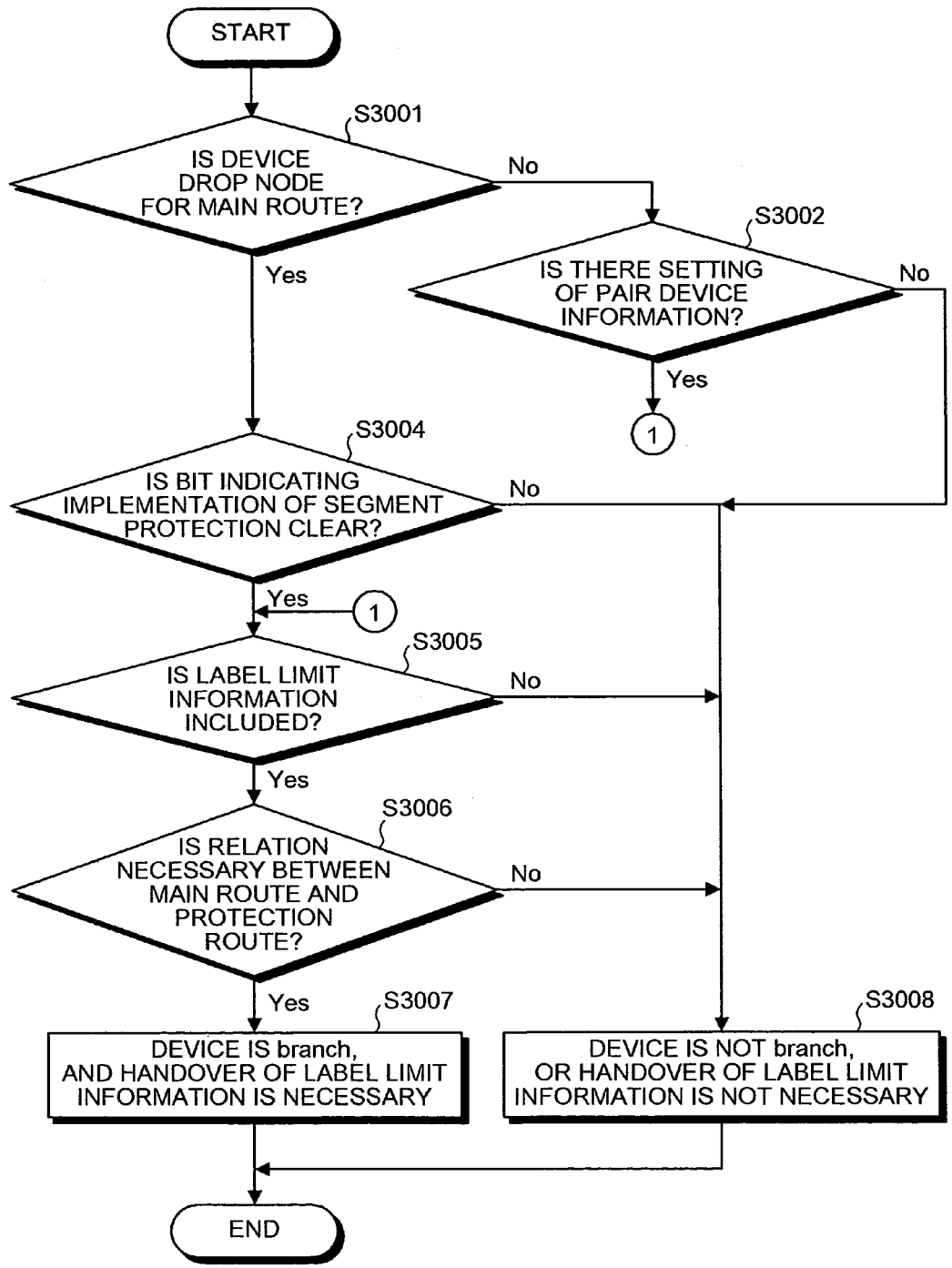
FIG. 31 is a revised flowchart of a process procedure of the branch determination process according to the third embodiment.
Figure 32:
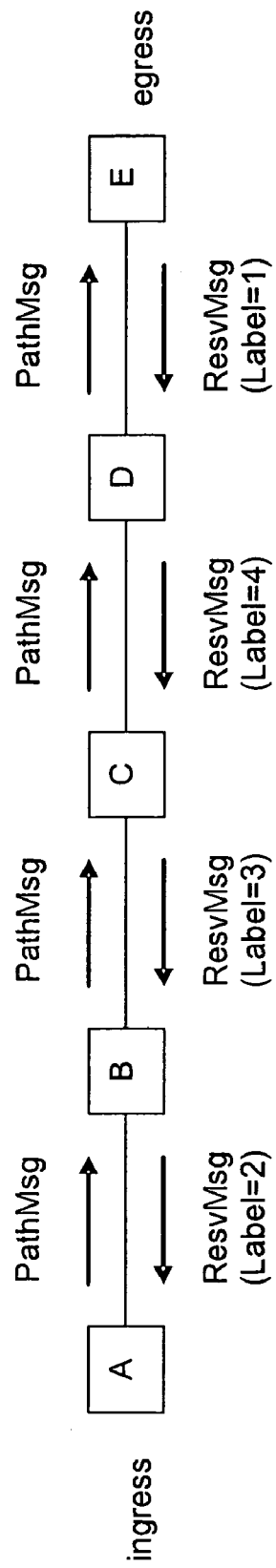
FIG. 32 is a diagram to explain an outline of label allocation based on signaling.
Figure 33:
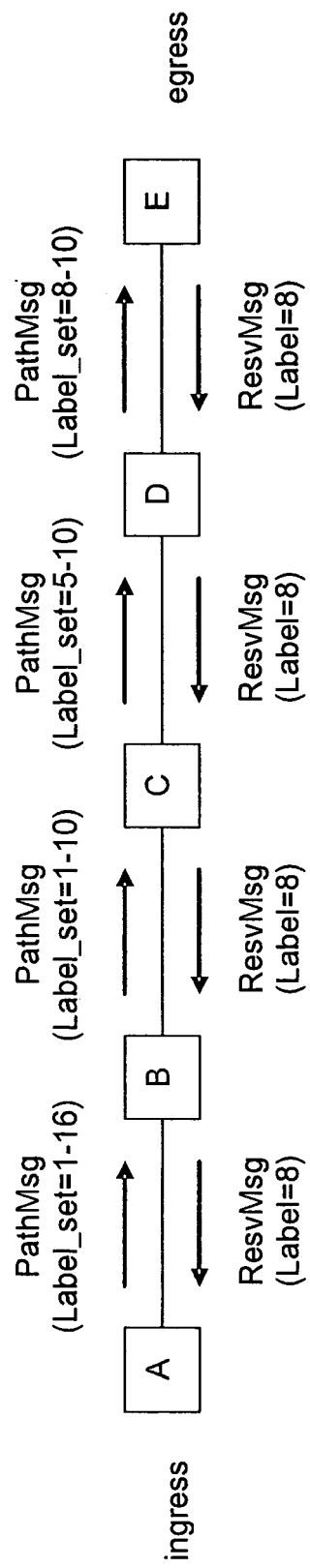
FIG. 33 is a diagram to explain label allocation using a label limit function.

FIG. 31 is a revised flowchart of a process procedure of the branch determination process according to the third embodiment. According to the process procedure shown in FIG. 31, a determination on whether the DROP node for the main route coincides with the pair device information is excluded, thereby solving the above problem. Even if this determination is excluded, the device can operate without any problem when other nodes that are set with the pair device information are not present in the same ring.

As explained above, in the third embodiment, the transmission device determines whether it is a branch or a merge based on the pair device information set in the storage unit. Therefore, the transmission device can autonomously allocate a label related to the main route and the protection route, without using a label limit handover request flag.

According to the present invention, a label that satisfies the label limit for the main route can be allocated to the protection route.

Moreover, a label related to the label for the protection route can be allocated to the main route.

Furthermore, a label that satisfies the label limit for the protection route can be allocated to the main route.

Moreover, a label related to the label for the main route can be allocated to the protection route.

Furthermore, the transmission device can autonomously allocate a related label to the main route and the protection route.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A transmission device that controls a route according to a label switching protocol, in a network having a main route and a protection route that protects the main route, comprising:
   an interface to send and receive messages; and
   a controller that determines a position of the transmission device in the network and reuses label limit information included in a connection establishment request message for the main route into label limit information of a connection establishment request message for the protection route that is sent to a next transmission device on the protection route, when the controller judges that the transmission device is positioned at a branch between the main route and the protection route.

2. The transmission device according to claim 1, wherein when the controller determines that the transmission device is positioned at a branch between the main route and the protection route, the controller waits for a connection establishment response message for the protection route after receiving a connection establishment response message for the main route, obtains the label limit information for the protection route from the connection establishment response message for the protection route, and allocates a label related to the label limit information obtained to the main route.

3. The transmission device according to claim 1, wherein when the controller determines that the transmission device is positioned at a merge between the main route and the protection route, the controller waits for the connection establishment request message for the protection route after receiving the connection establishment request message for the main route, and reuses the label limit information included in the connection establishment request message for the protection route into the label limit information of the connection establishment request message for the main route.

4. The transmission device according to claim 3, wherein when the controller determines that the transmission device is positioned at a merge between the main route and the protection route, the controller waits for a connection establishment response message for the main route after receiving a connection establishment request message for the protection route, obtains the label limit information for the main route from the connection establishment response message for the main route, and allocates a label to the label limit information obtained to the protection route based on a relation between the main route and the protection route.

5. The transmission device according to claim 1, wherein when the connection establishment request message received for the main route includes information indicating a section for the protection route and when the transmission device is positioned at an egress of the section, the controller determines that the transmission device is positioned at a branch between the main route and the protection route.

6. The transmission device according to claim 3, wherein when the connection establishment request message received for the main route includes information indicating a section for the protection route and when the transmission device is positioned at an ingress of the section, the controller determines that the transmission device is positioned at a merge between the main route and the protection route.

7. The transmission device according to claim 1, wherein by referring to link attribute information that is used for route control, when the controller recognizes that the transmission device is present at a position changing from a protection section to a non-protection section, and also when the controller finds a route that becomes the protection route, the controller determines that the transmission device is positioned at a branch between the main route and the protection route.

8. The transmission device according to claim 7, wherein when the controller determines that the transmission device is positioned at a branch between the main route and the protection route, the controller transmits, in the downstream direction, a connection establishment response message that includes information indicating that a label to be allocated to the main route and the protection route must be set based on a relation between the main route and the protection route.

9. The transmission device according to claim 8, wherein when the controller receives the connection establishment response message with information indicating that a label to be allocated to the main route and the protection route must be set based on a relation between the main route and the protection route, the controller determines that the transmission device is positioned at a merge between the main route and the protection route.

10. The transmission device according to claim 9, wherein when the controller determines that the transmission device is positioned at a merge between the main route and the protection route, the controller transmits, in the downstream direction, a connection establishment response message from which the information, indicating that a label to be allocated to the main route and the protection route needs to be set based on a relation between the main route and the protection route, is deleted.

11. The transmission device according to claim 7, further comprising:
a storage unit that stores information about whether the transmission device is in a ring involving a transmission device that overlaps with the ring and another ring, wherein
when the controller receives a connection establishment response message, the controller first refers to the storage unit, and when information indicating that the transmission device is in a ring where double links are set to another ring is not stored, the controller judges that the transmission device is not positioned at a branch or a merge between the main route and the protection route.

12. The transmission device according to claim 1, further comprising:
a storage unit that stores identification information of another transmission device, which is present in the same ring as that of the transmission device, and a link destination of which is the same ring as that of the transmission device, wherein
upon receiving a connection establishment request message for the main route, when a last transmission device in the ring of route information included in the connection establishment request message coincides with the another transmission device whose identification information is stored in the storage unit, the controller determines that the transmission device is positioned at a branch between the main route and the protection route.

13. The transmission device according to claim 12, wherein
when the controller determines that the transmission device is positioned at a branch between the main route and the protection route, the controller transmits, in the downstream direction, a connection establishment response message that includes information indicating that label allocation is being carried out for the protection route.

14. The transmission device according to claim 13, wherein
upon receiving a connection establishment request message for the main route, when the connection establishment request message does not include the information indicating that label allocation is being carried out for the protection route, and also when the transmission device is a last node of the ring in the main route, the controller determines that the transmission device is positioned at a branch between the main route and the protection route.

15. The transmission device according to claim 13, wherein
upon receiving the connection establishment response message including information indicating that label allocation is being carried out for the protection route, when the transmission device is an ADD node for the main route, and when a transmission device corresponding to the identification information stored in the storage unit is not present at the downstream of the route information included in the connection establishment request message, the controller determines that the transmission device is positioned at a merge between the main route and the protection route.

16. The transmission device according to claim 15, wherein
when the controller determines that the transmission device is positioned at a merge between the main route and the protection route, the controller transmits, in the downstream direction, a connection establishment response message from which the information, indicating that a label allocation for the protection route is being carried out, is deleted.

17. The transmission device according to claim 1, wherein the controller changes a system of reusing the label limit information, based on a predetermined condition.

18. The transmission device according to claim 1, wherein the transmission device is connected to a plurality of rings.

19. A label allocation method performed by a transmission device in a network, where a main route and a protection route that protects the main route are established, and where route control is executed based on a label switching protocol, comprising:
receiving a connection establishment request message for the main route from a previous transmission device on the main route;
determining whether the transmission device is positioned at a branch between the main route and the protection route based on the connection establishment request message for the main route;
reusing label limit information included in the connection establishment request message for the main route into label limit information included in a connection establishment request message for the protection route that is sent to a next transmission device on the protection route, if the transmission device is positioned at the branch;
waiting for a connection establishment response message for the protection route that is sent from the next transmission device on the protection route, after receiving a connection establishment response message for the main route that is sent from a next transmission device on the main route corresponding to the connection establishment request message for the main route;
acquiring label limit information allocated to the protection route, from the connection establishment response message for the protection route; and
allocating, based on a relation between the main route and the protection route, a label to the label limit information acquired at the acquiring into the connection establishment response message for the main route that is sent to the previous transmission device on the main route.

20. A label allocation method performed by a transmission device in a network, where a main route and a protection route that protects the main route are established, and where route control is executed based on a label switching protocol, comprising:
receiving a connection establishment request message for the main route from a previous transmission device on the main route;
determining whether the transmission device is positioned at a merge between the main route and the protection route based on the connection establishment request message for the main route;
waiting for a connection establishment request message for the protection route that is sent from a previous transmission device on the previous route, if the transmission device is positioned at the merge;
reusing label limit information included in the connection establishment request message for the protection route into label limit information included in the connection establishment request message for the main route that is sent to a next transmission device on the main route;
acquiring label limit information allocated to the main route from a connection establishment response message for the main route that is sent from the next transmission device on the main route, after waiting for the connection establishment response message for the main route; and
allocating, based on a relation between the main route and the protection route, a label to the label limit information acquired at the acquiring into the connection establishment response message for the protection route that is sent to the previous transmission device on the protection route.

* * * * *